(12) United States Patent
Seo et al.

(10) Patent No.: US 11,895,253 B2
(45) Date of Patent: Feb. 6, 2024

(54) ANTENNA STRUCTURE AND ELECTRONIC DEVICE INCLUDING THE SAME

(71) Applicant: SAMSUNG ELECTRONICS CO., LTD., Suwon-si (KR)

(72) Inventors: Seunghan Seo, Suwon-si (KR); Jaehoon Song, Suwon-si (KR); Dongil Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 181 days.

(21) Appl. No.: 17/652,725

(22) Filed: Feb. 28, 2022

(65) Prior Publication Data

US 2022/0286542 A1 Sep. 8, 2022

Related U.S. Application Data

(63) Continuation of application No. PCT/KR2022/002295, filed on Feb. 16, 2022.

(30) Foreign Application Priority Data

Mar. 4, 2021 (KR) .................. 10-2021-0028958

(51) Int. Cl.
  *H01Q 1/22* (2006.01)
  *H01Q 1/24* (2006.01)
  *H04M 1/02* (2006.01)
(52) U.S. Cl.
  CPC ........ *H04M 1/0218* (2013.01); *H01Q 1/2283* (2013.01); *H01Q 1/243* (2013.01); *H04M 1/0268* (2013.01)
(58) Field of Classification Search
  CPC .......... H01Q 1/22; H01Q 1/2283; H01Q 1/24; H01Q 1/243; H01Q 21/28; H04M 1/0216;
  (Continued)

(56) References Cited

U.S. PATENT DOCUMENTS 6,980,162 B1 12/2005 Laaksonen
10,249,933 B2 * 4/2019 Moon .................. G06F 1/1698
(Continued)

FOREIGN PATENT DOCUMENTS

CN 105206916 12/2015
JP 2014-078820 5/2014
(Continued)

OTHER PUBLICATIONS

Search Report and Written Opinion dated May 23, 2022 in counterpart International Patent Application No. PCT/KR2022/002295.

*Primary Examiner* — Tho G Phan
(74) *Attorney, Agent, or Firm* — Nixon & Vanderhye, P.C.

(57) ABSTRACT

According to various embodiments of the disclosure, an electronic device may comprise: a first housing including a first insulating portion, a second housing including a second insulating portion adjacent to the first insulating portion, a hinge connecting the first housing and the second housing to be pivotable from a folded state to an unfolded state with respect to a pivot shaft, a hinge cover exposed to an outside and covering the hinge in the folded state and including a third insulating portion in at least a partial area thereof, a flexible display configured to be deformable in response to relative motion of the second housing with respect to the first housing, and an antenna structure including an antenna circuit board disposed in at least a partial area of the hinge and a plurality of antenna elements comprising at least one antenna forming an array on or in the antenna circuit board. In the unfolded state, the plurality of antenna elements may be disposed to overlap the first insulating portion and/or the second insulating portion, and in the folded state, the plurality of antenna elements may be disposed to overlap the third insulating portion of the hinge cover.

20 Claims, 22 Drawing Sheets

(58) Field of Classification Search
CPC .. H04M 1/0218; H04M 1/026; H04M 1/0268; H04M 1/02
See application file for complete search history.

(56) References Cited

U.S. PATENT DOCUMENTS

| | | | | |
|---|---|---|---|---|
| 11,075,443 | B2* | 7/2021 | Yoo | H01Q 7/00 |
| 11,201,635 | B2* | 12/2021 | Chu | H04B 17/102 |
| 11,411,592 | B2* | 8/2022 | Lee | H05K 5/0017 |
| 11,463,563 | B2* | 10/2022 | Kim | G02B 6/0055 |
| 11,616,865 | B2* | 3/2023 | Jeong | H04M 1/0216 |
| | | | | 455/566 |
| 11,664,579 | B2* | 5/2023 | Lee | H05K 1/118 |
| | | | | 343/702 |
| 2005/0062657 | A1 | 3/2005 | Lin | |
| 2014/0240178 | A1 | 8/2014 | Chun et al. | |
| 2016/0118718 | A1 | 4/2016 | Guterman et al. | |
| 2017/0110786 | A1 | 4/2017 | Liu | |
| 2018/0026331 | A1 | 1/2018 | Chang et al. | |
| 2019/0006747 | A1 | 1/2019 | Wang et al. | |
| 2019/0356051 | A1 | 11/2019 | Barrera et al. | |
| 2020/0119432 | A1 | 4/2020 | Mizunuma et al. | |
| 2020/0125138 | A1 | 4/2020 | Lim et al. | |
| 2020/0333855 | A1 | 10/2020 | Kim et al. | |
| 2021/0280961 | A1 | 9/2021 | Kim et al. | |
| 2021/0391640 | A1 | 12/2021 | Mizunuma et al. | |
| 2022/0061175 | A1 | 2/2022 | Oh et al. | |

FOREIGN PATENT DOCUMENTS

| | | |
|---|---|---|
| JP | 2018-056693 | 4/2018 |
| JP | 2020-065246 | 4/2020 |
| KR | 10-2009-0013235 | 2/2009 |
| KR | 10-2012-0044229 | 5/2012 |
| KR | 10-2014-0105886 | 9/2014 |
| KR | 10-2020-0006754 | 1/2020 |
| KR | 10-2020-0031607 | 3/2020 |
| KR | 10-2020-0044394 | 4/2020 |
| KR | 10-2020-0072190 | 6/2020 |
| KR | 10-2020-0121199 | 10/2020 |

* cited by examiner

ND ELECTRONIC
ANTENNA STRUCTURE AND ELECTRONIC DEVICE INCLUDING THE SAME

CROSS-REFERENCE TO RELATED APPLICATIONS

This application is a continuation of International Application No. PCT/KR2022/002295 designating the United States, filed on Feb. 16, 2022, in the Korean Intellectual Property Receiving Office and claiming priority to Korean Patent Application No. 10-2021-0028958, filed on Mar. 4, 2021, in the Korean Intellectual Property Office, the disclosures of which are incorporated by reference herein in their entireties.

BACKGROUND

Field

The disclosure relates to an antenna structure and an electronic device including the antenna structure.

Description of Related Art

Advancing information communication and semiconductor technologies accelerate the spread and use of various electronic devices. In particular, recent electronic devices are being developed to carry out communication while carried on.

The term "electronic device" may refer to a device performing a particular function according to its equipped program, such as a home appliance, an electronic scheduler, a portable multimedia player, a mobile communication terminal, a tablet PC, a video/sound device, a desktop PC or laptop computer, a navigation for automobile, etc. For example, electronic devices may output stored information as voices or images. As electronic devices are highly integrated, and high-speed, high-volume wireless communication becomes commonplace, an electronic device, such as a mobile communication terminal, is recently being equipped with various functions. For example, an electronic device comes with the integrated functionality, including an entertainment function, such as playing video games, a multimedia function, such as replaying music/videos, a communication and security function for mobile banking, and a scheduling or e-wallet function. Such electronic devices become compact enough for users to carry in a convenient way.

As mobile communication services extend up to multimedia service sectors, the display of the electronic device may be increased to allow the user satisfactory use of multimedia services as well as voice call or text messaging services. Accordingly, a foldable flexible display may be disposed on the entire area of the housing structure separated to be foldable.

In a foldable electronic device equipped with a millimeter (mmW) antenna structure, an antenna structure may be disposed along a side surface and/or rear surface of one housing structure to allow an antenna beam to be radiated to the side surface and/or rear surface of the electronic device regardless of the unfolded and folded status. In an antenna structure disposed on the rear surface of an electronic device, the antenna radiation characteristics may be deteriorated as the surrounding structures block or interfere with a portion of the antenna radiation path when the foldable electronic device folds or unfolds. Further, in the antenna structure disposed on the rear surface of the electronic device, the mounting area of the main circuit board may be reduced due to the horizontal mounting, and the performance of the surrounding antenna (e.g., GPS or Wi-Fi) may be decreased.

SUMMARY

Embodiments of the disclosure provide a structure capable of transmitting and/or receiving an antenna signal regardless of, or with reduced influence by, physical deformation by a relative movement between the housing structures.

According to various example embodiments of the disclosure, an electronic device may comprise: a first housing including a first insulating portion, a second housing including a second insulating portion adjacent to the first insulating portion, a hinge connecting the first housing and the second housing to be pivotable from a folded state to an unfolded state with respect to a pivot shaft, a hinge cover exposed to an outside and covering at least a portion of the hinge in the folded state and including a third insulating portion in at least a partial area thereof, a flexible display configured to be deformable in response to relative motion of the second housing with respect to the first housing, and an antenna structure including an antenna circuit board disposed in at least a partial area of the hinge and a plurality of antenna elements comprising at least one antenna forming an array on or in the antenna circuit board. In the unfolded state, the plurality of antenna elements may be disposed to overlap the first insulating portion and/or the second insulating portion, and in the folded state, the plurality of antenna elements may be disposed to overlap the third insulating portion of the hinge cover.

According to various example embodiments of the disclosure, an electronic device may comprise: a first housing, a second housing, a hinge connecting the first housing and the second housing to be pivotable from a folded state to an unfolded state with respect to a pivot shaft, a hinge cover at least partially covering the hinge and including a first insulating portion in at least a partial area thereof, a flexible display configured to be deformed in response to relative motion of the second housing with respect to the first housing, and an antenna structure including an antenna circuit board disposed in at least a partial area of the hinge and a plurality of antenna elements comprising at least antenna forming an array on or in the antenna circuit board. The plurality of antenna elements may be disposed to face the first insulating portion of the hinge cover and may be configured to radiate a directional beam through the first insulating portion.

According to various example embodiments of the disclosure, in a foldable electronic device including a plurality of housing structures (e.g., a first housing structure and a second housing structure), a hinge structure may include an antenna structure to prevent and/or reduce degradation of the radiation performance due to the physical deformation between the housing structures.

According to various example embodiments of the disclosure, a foldable electronic device including a plurality of housing structures (e.g., a first housing structure and a second housing structure) is implemented to allow a hinge structure to include an antenna structure, enhancing the mounting space of the electronic device.

According to various example embodiments of the disclosure, in a foldable electronic device including a plurality of housing structures (e.g., a first housing structure and a second housing structure), a hinge structure may include an antenna structure, and an antenna structure disposed to a side surface of the electronic device may be provided. Thus, when the foldable electronic device is unfolded, the plurality of antenna structures may provide a radiation area where they do not interfere with each other and, when the foldable electronic device is folded, antenna radiation beams may be provided to two opposite sides. Thus, the antenna characteristics may be enhanced.

Effects of the disclosure are not limited to the foregoing, and other unmentioned effects would be apparent to one of ordinary skill in the art from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
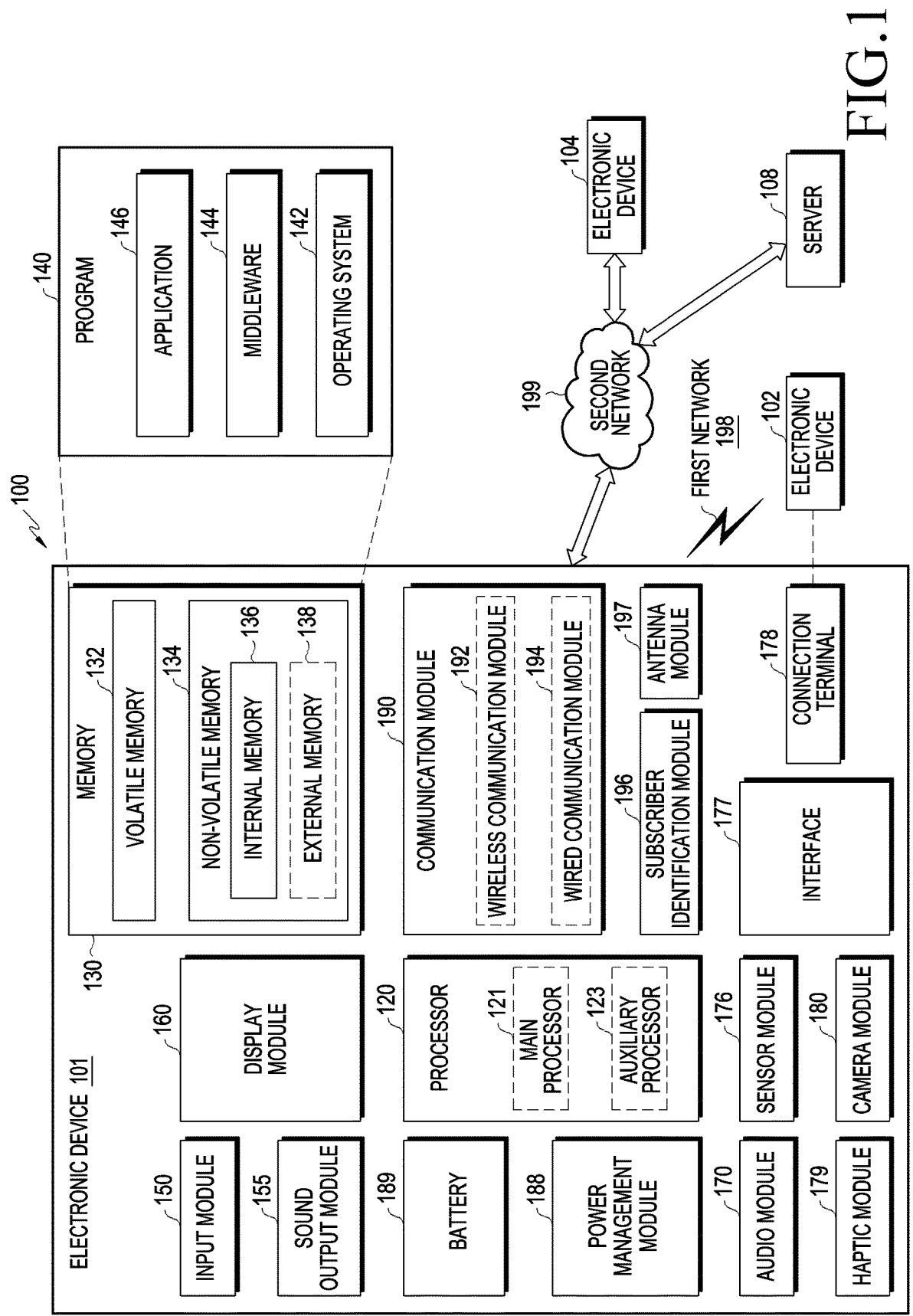
FIG. 1 is a block diagram illustrating an example electronic device in a network environment according to various embodiments.

FIG. 1 is a block diagram illustrating an example electronic device in a network environment according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
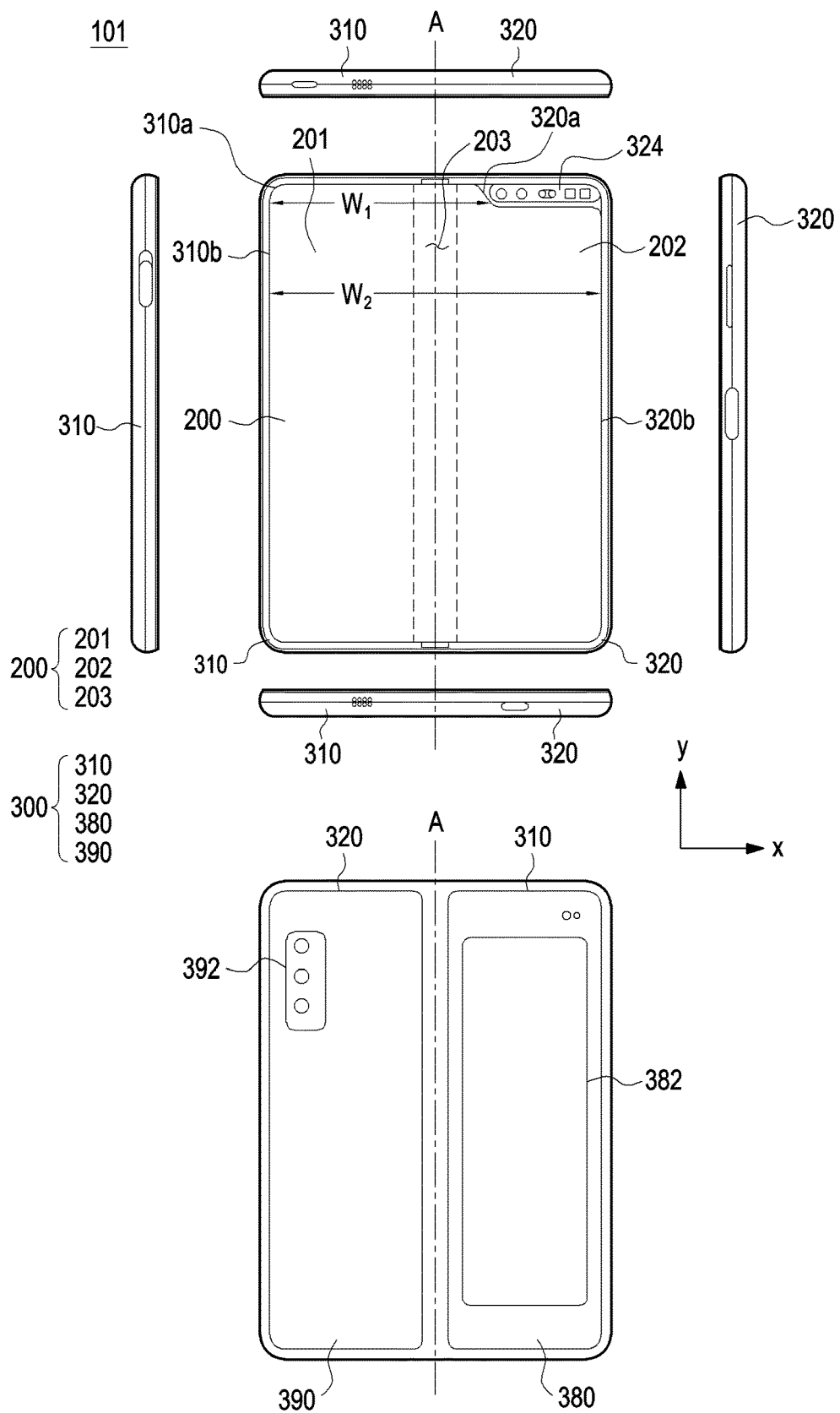
FIG. 2 is a diagram illustrating an unfolded state of a foldable electronic device according to various embodiments.
Figure 3:
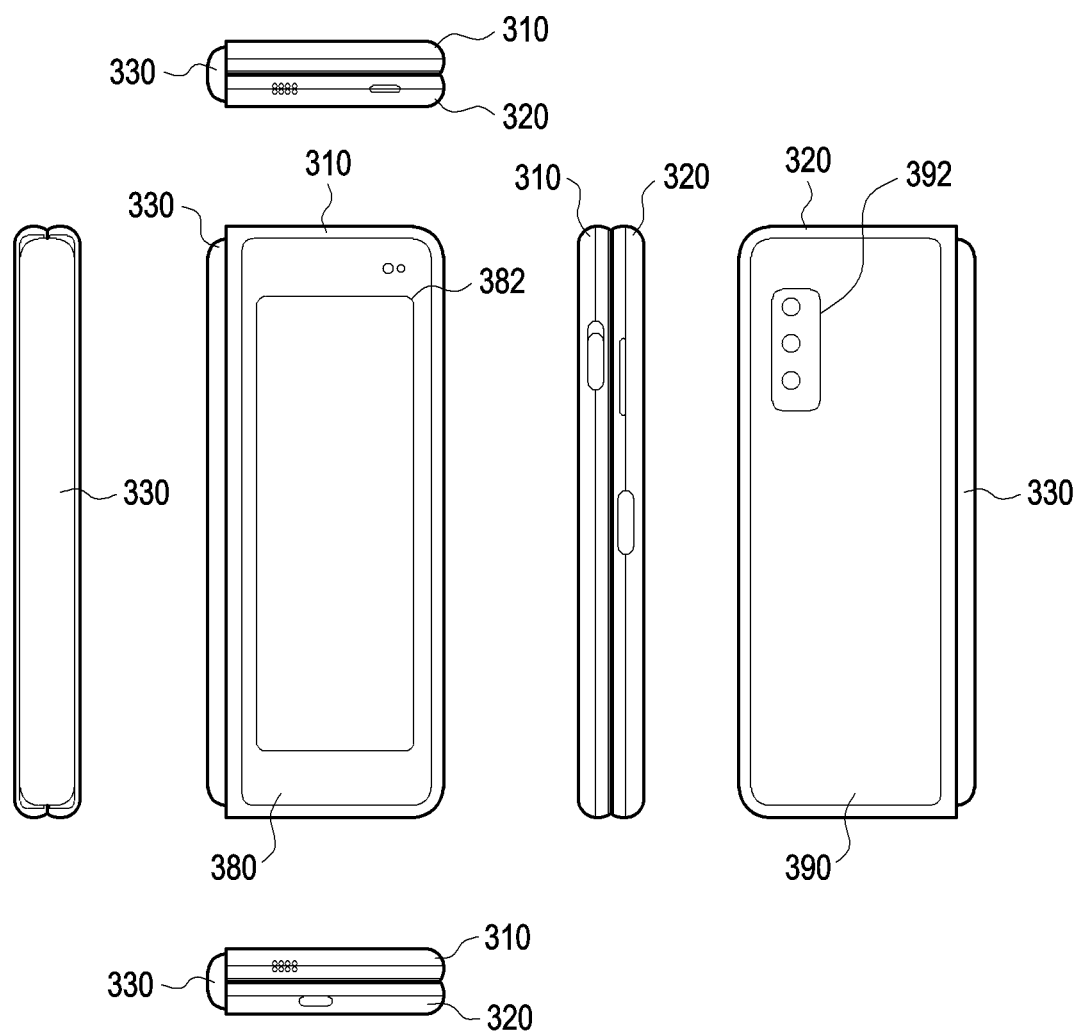
FIG. 3 is a diagram illustrating a folded state of a foldable electronic device according to various embodiments.

FIG. 2 is a diagram illustrating an unfolded state among folding states of a foldable electronic device according to various embodiments. FIG. 3 is a diagram illustrating a folded state among folding states of a foldable electronic device according to various embodiments.

Referring to FIGS. 2 and 3, according to an embodiment, a foldable electronic device (hereinafter, an electronic device 101) may include a foldable housing 300, a hinge case (e.g., the hinge case 330 of FIG. 3) (e.g., a hinge cover) covering a foldable portion of the foldable housing 300, and a flexible or foldable display 200 (hereinafter, simply "display 200") (e.g., the display device 160 of FIG. 1) disposed in a space formed by the foldable housing 300. According to an embodiment, the surface on which the display 200 is disposed is defined as a front surface of the electronic device 101. The opposite surface of the front surface is defined as a rear surface of the electronic device 101. Further, the surface surrounding the space between the front and rear surfaces is defined as a side surface of the electronic device 101.

Figure 4:
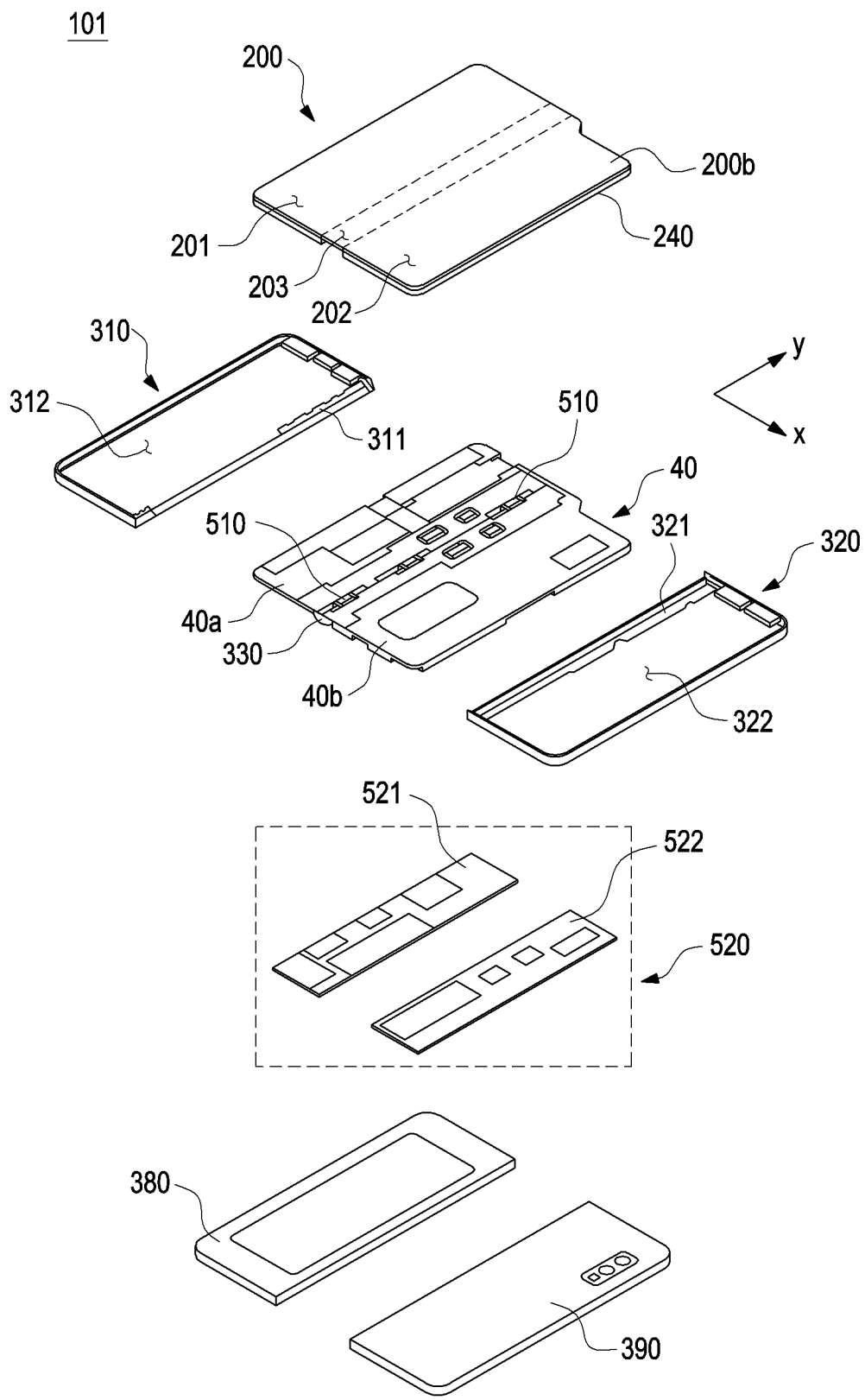
FIG. 4 is an exploded perspective view illustrating a foldable electronic device according to various embodiments.

According to various embodiments, the foldable housing 300 may include a first housing structure 310, a second housing structure 320 including a sensor area 324, a first rear cover 380, a second rear cover 390, and a hinge structure (e.g., the hinge structure 510 of FIG. 4). The foldable housing 300 of the electronic device 101 are not limited to the shape and coupling shown in FIGS. 2 and 3 but may rather be implemented in other shapes or via a combination and/or coupling of other components. For example, the first housing structure 310 and the first rear cover 380 may be integrally formed with each other, and the second housing structure 320 and the second rear cover 390 may be integrally formed with each other.

According to various embodiments, the first housing structure 310 may be connected to the hinge structure (e.g., the hinge structure 510 of FIG. 4) and may include a first surface facing in a first direction and a second surface facing in a second direction opposite to the first direction. The second housing structure 320 may be connected to the hinge structure 510 and may include a third surface facing in a third direction and a fourth surface facing in a fourth direction opposite to the third direction, and may rotate from the first housing structure 310 on the hinge structure 510. Thus, the electronic device 101 may turn into a folded status or unfolded status (the terms "state" and "status" may be used interchangeably herein in the context of or in reference to the folded or unfolded state or status of the electronic device). In the folded status of the electronic device 101, the first surface may face the third surface and, in the unfolded status, the third direction may be identical to the first direction.

According to various embodiments, the first housing structure 310 and the second housing structure 320 may be disposed on both sides of the folding axis A, and may have an overall symmetrical shape with respect to the folding axis A. As is described below, the angle or distance between the first housing structure 310 and the second housing structure 320 may be varied depending on whether the electronic device 101 is in the unfolded status, the folded status, or the partially unfolded intermediate status. According to an embodiment, the second housing structure 320 further includes the sensor area 324 where various sensors are disposed, unlike the first housing structure 310 but, in the remaining area, the second housing structure 320 may be symmetrical in shape with the first housing structure 310.

According to various embodiments, as shown in FIG. 2, the first housing structure 310 and the second housing structure 320 together may form a recess to receive the display 200. In an embodiment, due to the sensor area 324, the recess may have two or more different widths in the direction perpendicular to the folding axis A.

According to an embodiment, the recess may have a first width w1 between a first portion 310a of the first housing structure 310, which is parallel with the folding axis A, and a first portion 320a of the second housing structure 320, which is formed at an edge of the sensor area 324. The recess may have a second width w2 formed by a second portion 310b of the first housing structure 310 and a second portion 320b of the second housing structure 320, which does not correspond to the sensor area 324 and is parallel with the folding axis A. In this case, the second width w2 may be longer than the first width w1. As another example, the first portion 310a of the first housing structure 310 and the first portion 320a of the second housing structure 320, which are asymmetrical with each other, may form the first width w1 of the recess, and the second portion 310b of the first housing structure 310 and the second portion 320b of the second housing structure 320, which are symmetrical with each other, may form the second width w2 of the recess. In an embodiment, the first portion 320a and second portion 320b of the second housing structure 320 may have different distances from the folding axis A. The width of the recess is not limited thereto. According to an embodiment, the recess may have a plurality of widths due to the shape of the sensor area 324 or the asymmetric portions of the first housing structure 310 and the second housing structure 320.

According to various embodiments, at least a portion of the first housing structure 310 and the second housing structure 320 may be formed of a metal or a non-metal material having a predetermined degree of rigidity to support the display 200. At least a portion formed of metal may provide a ground plane of the electronic device 101 and may be electrically connected with a ground line formed on a printed circuit board (e.g., the board unit 520 of FIG. 4).

According to various embodiments, the sensor area 324 may be formed adjacent to a corner of the second housing 320 and to have a predetermined area. However, the placement, shape, or size of the sensor area 324 is not limited to those illustrated. For example, in an embodiment, the sensor area 324 may be provided in a different corner of the second housing structure 320 or in any area between the top corner and the bottom corner. In an embodiment, components for performing various functions, embedded in the electronic device 101, may be visually exposed through the sensor area 324 or one or more openings in the sensor area 324 to the front surface of the electronic device 101. In various embodiments, the components may include various kinds of sensors. The sensor may include at least one of, e.g., a front-facing camera, a receiver, or a proximity sensor.

According to various embodiments, the first rear cover 380 may be disposed on one side of the folding axis A on the rear surface of the electronic device 101 and have, e.g., a substantially rectangular periphery which may be surrounded by the first housing structure 310. Similarly, the second rear cover 390 may be disposed on the opposite side of the folding axis on the rear surface of the electronic device 101 and its periphery may be surrounded by the second housing structure 320.

According to various embodiments, the first rear cover 380 and the second rear cover 390 may be substantially symmetrical in shape with respect to the folding axis (axis A). However, the first rear cover 380 and the second rear cover 390 are not necessarily symmetrical in shape. In an embodiment, the electronic device 101 may include the first rear cover 380 and the second rear cover 390 in various shapes. According to an embodiment, the first rear cover 380 may be integrally formed with the first housing structure 310, and the second rear cover 390 may be integrally formed with the second housing structure 320.

According to various embodiments, the first rear cover 380, the second rear cover 390, the first housing structure 310, and the second housing structure 320 may form a space where various components (e.g., a printed circuit board or battery) of the electronic device 101 may be disposed. According to an embodiment, one or more components may be arranged or visually exposed on/through the rear surface of the electronic device 101. For example, at least a portion of a sub display may be visually exposed through a first rear surface area 382 of the first rear cover 380. In an embodiment, one or more components or sensors may be visually exposed through a second rear surface area 392 of the second rear cover 390. According to various embodiments, the sensor may include a proximity sensor and/or a rear-facing camera.

According to various embodiments, a front camera visually exposed to the front surface of the electronic device 101 through one or more openings prepared in the sensor area 324 or a rear camera exposed through a second rear surface area 392 of the second rear cover 390 may include one or more lenses, an image sensor, and/or an image signal processor. The flash may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 101.

Referring to FIG. 3, the hinge case (e.g., hinge cover) 330 may be disposed between the first housing structure 310 and the second housing structure 320 to hide the internal components (e.g., the hinge structure 510 of FIG. 4). According to an embodiment, the hinge case 330 may be hidden by a portion of the first housing structure 310 and second housing structure 320 or be exposed to the outside depending on the folding status (e.g., the unfolded status, intermediate status, or folded status) of the electronic device 101.

According to an embodiment, as shown in FIG. 2, in the unfolded status of the electronic device 101, the hinge case 330 may be hidden, and thus not exposed, by the first housing structure 310 and the second housing structure 320. As another example, as shown in FIG. 3, in the folded status (e.g., a fully folded status) of the electronic device 101, the hinge case 330 may be exposed to the outside between the first housing structure 310 and the second housing structure 320. As another example, in an intermediate status in which the first housing structure 310 and the second housing structure 320 are folded with a certain angle, the hinge case 330 may be partially exposed to the outside between the first housing structure 310 and the second housing structure 320. In this case, however, the exposed area may be smaller than in the fully folded status. According to an embodiment, the hinge case 330 may include a curved surface.

According to various embodiments, the display 200 may be disposed in a space formed by the foldable housing 300. For example, the display 200 may be seated on a recess formed by the foldable housing 300 and may occupy most of the front surface of the electronic device 101. Thus, the front surface of the electronic device 101 may include the display 200 and a partial area of the first housing structure 310 and a partial area of the second housing structure 320, which are adjacent to the display 200. The rear surface of the electronic device 101 may include the first rear cover 380, a partial area of the first housing structure 310, which is adjacent to the first rear cover 380, the second rear cover 390, and a partial area of the second housing structure 320, which is adjacent to the second rear cover 390.

According to various embodiments, the display 200 may refer, for example, to a display at least a portion of which may be transformed into a flat or curved surface. According to an embodiment, the display 200 may include a folding area 203, a first area 201 disposed on one side of the folding area 203 (e.g., the left side of the folding area 203 of FIG. 2), and a second area 202 disposed on the opposite side of the folding area 203 (e.g., the right side of the folding area 203 of FIG. 2).

However, the segmentation of the display 200 as shown in FIG. 2 is merely an example, and the display 200 may be divided into a plurality of (e.g., four or more, or two) areas depending on the structure or function of the display 200. For example, in the embodiment illustrated in FIG. 2, the display 200 may be divided into the areas by the folding area 203 or folding axis (axis A) extending in parallel with the y axis but, in an embodiment, the display 200 may be divided into the areas with respect to another folding area (e.g., a folding area parallel with the x axis) or another folding axis (e.g., a folding axis parallel with the x axis). According to an embodiment, the display 200 may be coupled with or disposed adjacent to a touch detection circuit, a pressure sensor capable of measuring the strength (pressure) of touches, and/or a digitizer for detecting a magnetic field-type stylus pen.

According to various embodiments, the first area 201 and the second area 202 may be overall symmetrical in shape with respect to the folding area 203. However, unlike the first area 201, the second area 202 may include a notch depending on the presence of the sensor area 324, but the rest may be symmetrical in shape with the first area 201. In other words, the first area 201 and the second area 202 may include symmetrical portions and asymmetrical portions.

Described below are the operation of the first housing structure 310 and the second housing structure 320 and each area of the display 200 depending on the state (e.g., the folded status, unfolded status, or intermediate status) of the electronic device 101.

According to various embodiments, when the electronic device 101 is in the unfolded status (e.g., FIG. 2), the first housing structure 310 and the second housing structure 320 may be disposed to face in the same direction while being angled at 180 degrees therebetween. The surface of the first area 201 and the surface of the second area 202 of the display 200 may be angled at 180 degrees therebetween while facing in the same direction (e.g., forward of the front surface of the electronic device). The folding area 203 may be coplanar with the first area 201 and the second area 202.

According to various embodiments, when the electronic device 101 is in the folded status (e.g., FIG. 3), the first housing structure 310 and the second housing structure 320 may face each other. The surface of the first area 201 and the surface of the second area 202 of the display 200 may be angled at a small angle (e.g., ranging from 0 degrees to 10 degrees) therebetween while facing each other. At least a portion of the folding area 203 may have a curved surface with a predetermined curvature.

According to various embodiments, in the intermediate status of the electronic device 101, the first housing structure 310 and the second housing structure 320 may be arranged at a certain angle therebetween. The surface of the first area 201 of the display 200 and the surface of the second area 202 may form an angle which is larger than the angle in the folded status and smaller than the angle in the unfolded status. The folding area 203 may at least partially have a curved surface with a predetermined curvature and, in this case, the curvature may be smaller than that when it is in the folded status.

FIG. 4 is an exploded perspective view illustrating a foldable electronic device according to various embodiments.

Referring to FIG. 4, according to various embodiments, a foldable electronic device (hereinafter, the electronic device 101) may include a foldable housing, a flexible display (hereinafter, the display device 200), and a board unit 520. The foldable housing may include a first housing structure (e.g., first housing) 310, a second housing structure (e.g., second housing) 320, a first rear cover 380 and a second rear cover 390, a bracket assembly (e.g., bracket) 40, and a hinge structure (e.g., hinge) 510. The first housing structure 310 may include a first housing 312 and a partial area (e.g., a first bracket 40a) of the bracket assembly 40. The second housing structure 320 may include a second housing 322 and a partial area (e.g., the second bracket 40b) of the bracket assembly 40.

According to various embodiments, the display device 200 may include a display panel 200b (e.g., a flexible display panel) and one or more plates or layers (e.g., a supporting plate 240) on which the display panel 200b is seated. According to an embodiment, the supporting plate 240 may be disposed between the display panel 200b and the bracket assembly 40. An adhesive structure (not shown) may be positioned between the supporting plate 240 and the bracket assembly 40, attaching the supporting plate 240 and the bracket assembly 40.

According to various embodiments, the bracket assembly 40 may include a first bracket 40a and a second bracket 40b, and a hinge structure 510 may be disposed between the first bracket 40a and the second bracket 40b. The hinge structure 510 may include the hinge case 330 to cover the hinges disposed therein. As another example, a printed circuit board (e.g., a flexible printed circuit (FPC)) may be disposed to cross the first bracket 40a and the second bracket 40b.

According to various embodiments, the board unit 520 may include a first main circuit board 521 disposed on a side of the first bracket 40a and a second main circuit board 522 disposed on a side of the second bracket 40b. The first main circuit board 521 and the second main circuit board 522 may be disposed in a space formed by the bracket assembly 40, the first housing structure 310, the second housing structure 320, the first rear cover 380, and the second rear cover 390. Components for implementing various functions of the electronic device 101 may be disposed on the first main circuit board 521 and the second main circuit board 522.

According to various embodiments, the first housing 312 and the second housing 322 may be assembled together to be coupled to two opposite sides of the bracket assembly 40, with the display 200 coupled to the bracket assembly 40. For example, the first housing 312 may be coupled by sliding from one side of the first bracket 40a, and the second housing 322 may be coupled by sliding from one side of the second bracket 40b.

According to an embodiment, the first housing structure 310 may include a first rotation supporting surface 311 disposed on one end of the first housing 312, and the second housing structure 320 may include a second rotation supporting surface 321, corresponding to the first rotation supporting surface 313, disposed on one end of the second housing 322. The first rotation supporting surface 311 and the second rotation supporting surface 321 may include a curved surface corresponding to a curved surface included in the hinge case 330.

According to an embodiment, the first rotation supporting surface 311 and the second rotation supporting surface 321, in the unfolded status of the electronic device 101 (e.g., the electronic device of FIG. 2), may cover the hinge case 330, allowing the hinge case 330 to be not or minimally exposed through the rear surface of the electronic device 101. As another example, the first rotation supporting surface 311 and the second rotation supporting surface 321, in the folded status of the electronic device 101 (e.g., the electronic device of FIG. 3), may rotate along the curved surface included in the hinge case 330, allowing the hinge case 330 to be maximally exposed through the rear surface of the electronic device 101.

Figure 5A:
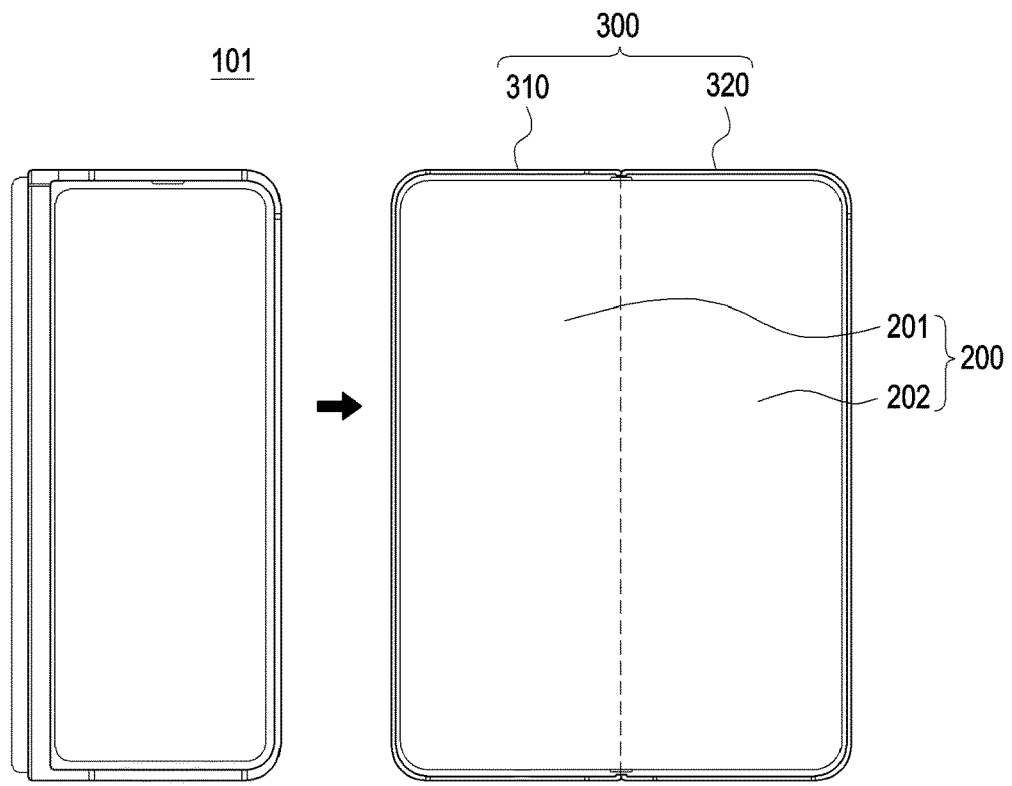
FIGS. 5A and 5B are diagrams illustrating an example of a folded state or an unfolded state of a foldable electronic device according to various embodiments.
Figure 5B:
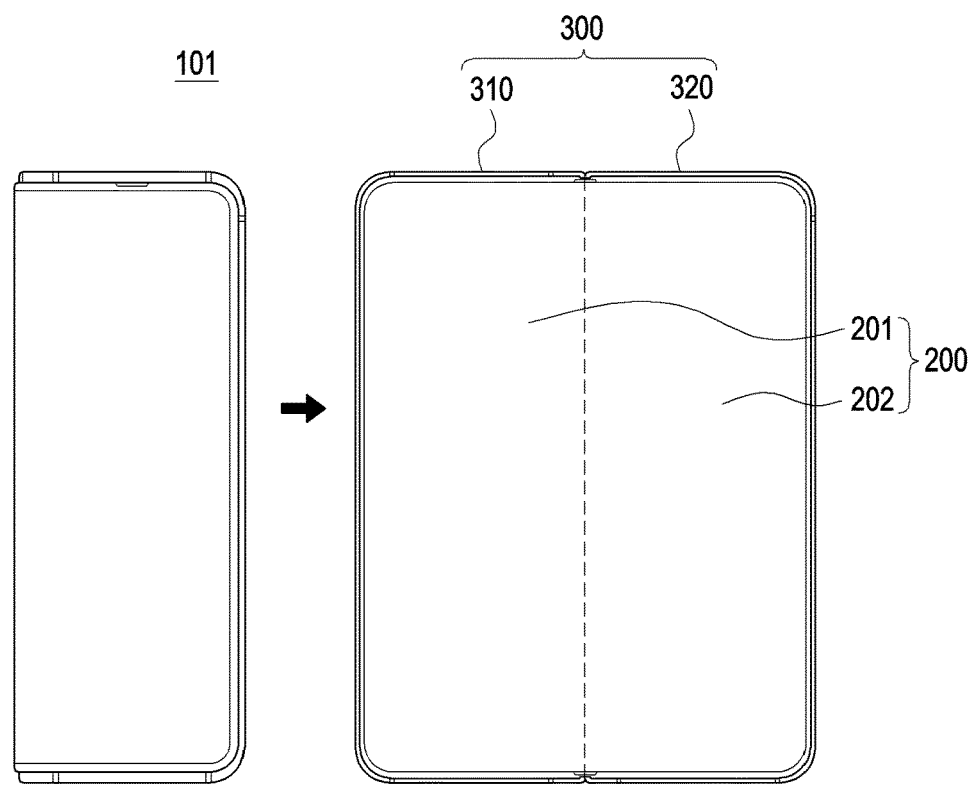

FIGS. 5A and 5B are diagrams illustrating an example of a folded state or an unfolded state of a foldable electronic device according to various embodiments.

Referring to FIGS. 5A and 5B, a foldable electronic device (hereinafter, the electronic device 101) may include a foldable housing 300 and a flexible display 200. The foldable housing 300 may include a first housing structure 310 and a second housing structure 320 that are rotated with respect to each other by a hinge assembly. The flexible display 200 may be disposed to extend from the first housing structure 310 to the second housing structure 320 and may form a curved surface corresponding to a folded status or an unfolded status of the electronic device 101. The flexible display 200 may include a front facing outward and a rear surface facing inward of the electronic device 101.

According to various embodiments, the electronic device 101 may include an in-folding type (e.g., FIG. 5A) or an out-folding type (e.g., FIG. 5B). The in-folding type may refer to a state in which the flexible display 200 is not exposed to the outside in the fully folded status. As another example, it may refer, for example, to a state in which the flexible display 200 is folded in the front direction. The out-folding type may refer, for example, to a state in which the flexible display 200 is visually exposed to the outside in the fully folded status. As another example, it may refer, for example, to a state in which the flexible display 200 is folded in the rear direction.

According to various embodiments, the electronic device 101 may include a multi-foldable device configured in an in-out folding type. As another example, the flexible display 200 may have a rectangular shape with rounded corners and a narrow bezel area. The flexible display 200 may include a first area 201 disposed in the first housing structure 310 and a second area 202 disposed in the second housing structure 320, and the first area 201 and the second area 202 may be implemented in the same shape.

The components of the electronic device 101 of FIGS. 1 to 4 may be applied to the components of the electronic device 101 of FIGS. 5A and 5B.

Figure 6A:
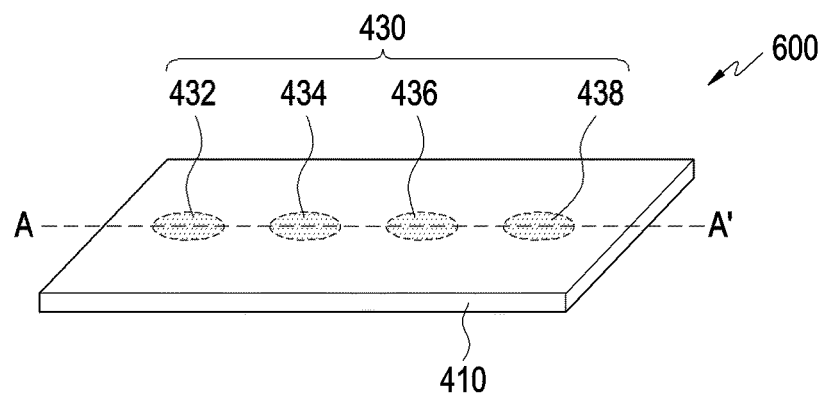
FIGS. 6A, 6B and 6C are diagrams illustrating an example a structure of an antenna module disposed in an electronic device, according to various embodiments.
Figure 6B:
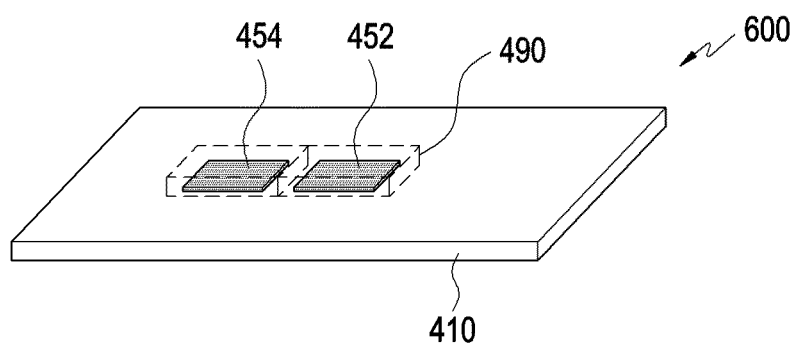
Figure 6C:
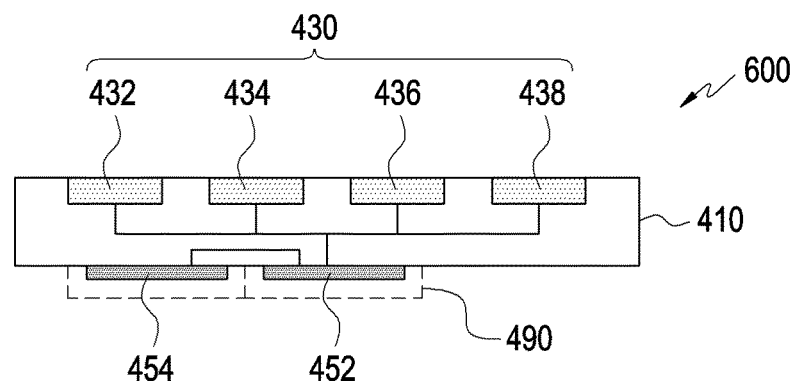

FIGS. 6A, 6B and 6C are diagrams illustrating an example of a structure of an antenna module disposed in an electronic device, according to various embodiments. FIG. 6A is a perspective view of an antenna module as viewed from one side, and FIG. 6B is a perspective view of the antenna module as viewed from another side. FIG. 6C is a cross-sectional view of the antenna module, taken along line A-A'.

Referring to FIGS. 6A, 6B and 6C, according to an embodiment, an antenna structure 600 may include a printed circuit board 410, an antenna array 430, a radio frequency integrated circuit (RFIC) 452, and a power management integrated circuit (PMIC) 454. Optionally, the antenna structure 600 may further include a shielding member (e.g., shield) 490. According to various embodiments, at least one of the above-mentioned components may be omitted, or at least two of the components may be integrally formed with each other.

According to an embodiment, the printed circuit board 410 may include a plurality of conductive layers and a plurality of non-conductive layers alternately stacked with the conductive layers. Electronic components arranged on, or outside of, the printed circuit board 410 may be electrically connected together via wires and conductive vias formed on or through the conductive layers.

According to an embodiment, the antenna array 430 may include a plurality of antenna elements 432, 434, 436, or 438 arranged to form directional beams. The plurality of antenna elements may be formed on a first surface of the printed circuit board 410 as shown. According to an embodiment, the antenna array 430 may be formed inside the printed circuit board 410. According to embodiments, the antenna array 430 may include a plurality of antenna arrays (e.g., a dipole antenna array and/or a patch antenna array) of the same or different shapes or kinds.

According to an embodiment, the RFIC 452 may be disposed in another area (e.g., a second surface opposite to the first surface) of the printed circuit board 410 which is spaced apart from the antenna array. The RFIC is configured to be able to process signals of a selected frequency band which are transmitted or received via the antenna array 430. According to an embodiment, upon transmission, the RFIC 452 may convert a baseband signal obtained from a communication processor (not shown) into a designated band of RF signal. Upon receipt, the RFIC 452 may convert the RF signal received via the antenna array 552 into a baseband signal and transfer the baseband signal to the communication processor.

According to an embodiment, upon transmission, the RFIC 452 may up-convert an IF signal (e.g., ranging from about 9 GHz to about 15 GHz) obtained from the intermediate frequency integrated circuit (IFIC) into a selected band of RF signal. Upon receipt, the RFIC 452 may down-convert the RF signal obtained via the antenna array 430 into an IF signal and transfer the IF signal to the IFIC.

According to an embodiment, the PMIC 454 may be disposed in another portion (e.g., the second surface) of the PCB 410 which is spaced apart from the antenna array. The PMIC may receive a voltage from the main PCB (not shown) and provide necessary power to various components (e.g., the RFIC 452) on the antenna module.

According to an embodiment, the shielding member 490 may be disposed in a portion (e.g., the second surface) of the PCB 410 to electromagnetically shield off at least one of the RFIC 452 or the PMIC 454. According to an embodiment, the shielding member 490 may include a shield can.

Although not shown, according to various embodiments, the antenna structure 600 may be electrically connected with another printed circuit board (e.g., the main printed circuit board) via the module interface. The module interface may include a connecting member, e.g., a coaxial cable connector, board-to-board connector, interposer, or flexible printed circuit board (FPCB). The RFIC 452 and/or the PMIC 454 may be electrically connected with the printed circuit board via the connecting member.

Figure 7A:
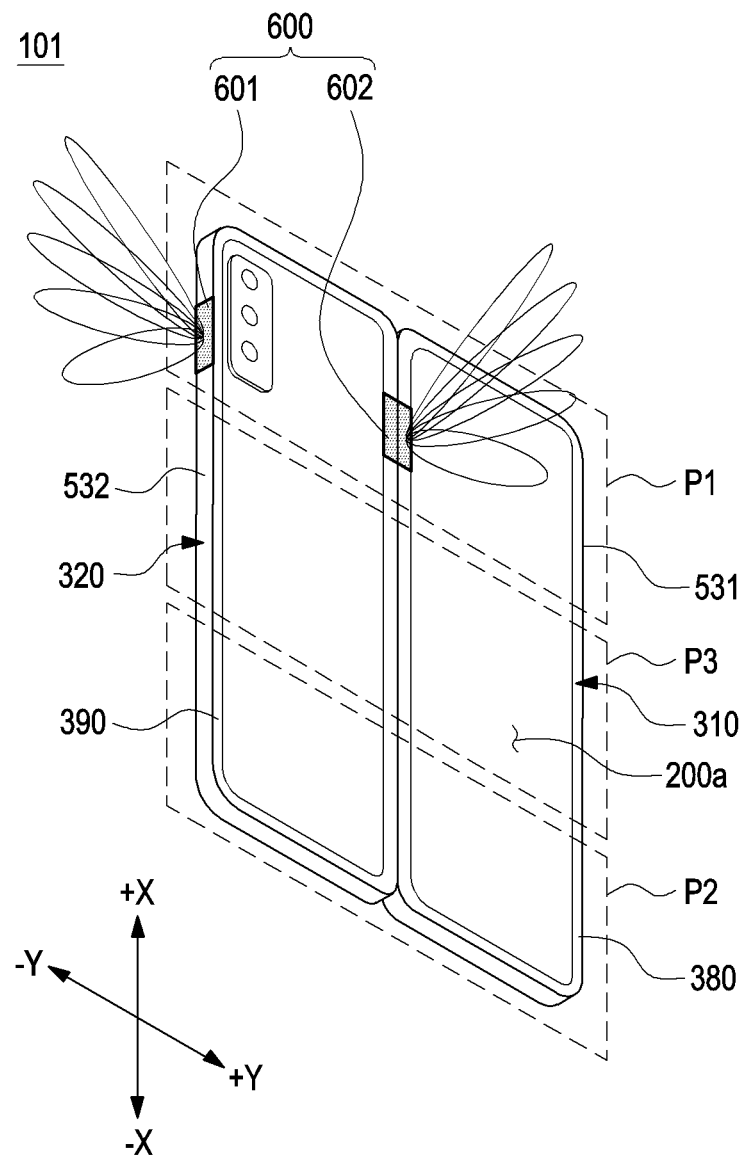
FIG. 7A is a perspective view illustrating an example radiation shape according to a disposition of an antenna structure in an unfolded state of a foldable electronic device, according to various embodiments.
Figure 7B:
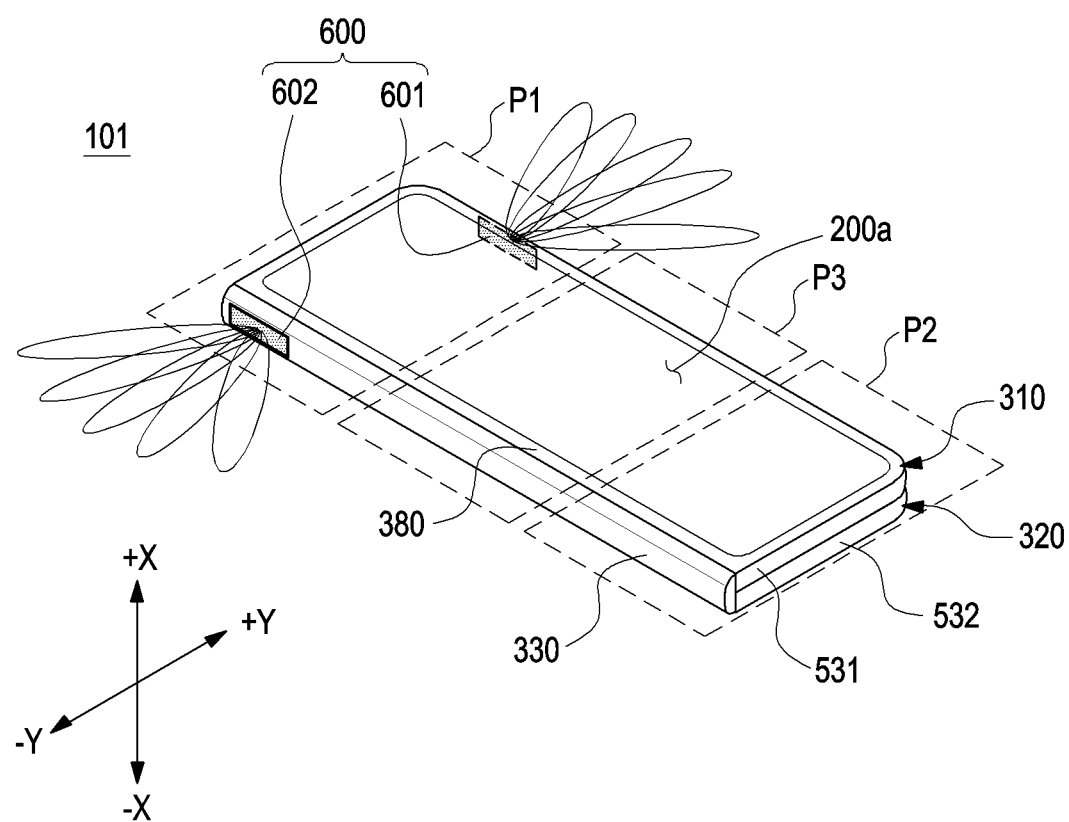
FIG. 7B is a perspective view illustrating an example radiation shape according to an arrangement of an antenna structure in a folded state of a foldable electronic device, according to various embodiments.

FIG. 7A is a perspective view illustrating an example radiation shape according to a disposition of an antenna structure in an unfolded state of a foldable electronic device, according to various embodiments. FIG. 7B is a perspective view illustrating an example radiation shape according to an arrangement of an antenna structure in a folded state of a foldable electronic device, according to various embodiments.

According to various embodiments, an electronic device (e.g., the electronic device 101 of FIGS. 1 to 4) may include a first housing structure 310, a second housing structure 320, a display (e.g., the sub display 200a), a hinge module (e.g., a hinge structure (e.g., a hinge structure 700 of FIG. 8) and a hinge cover 330), and an antenna structure 600. According to an embodiment, the electronic device 101 may include a front-facing display (e.g., the display 200 of FIG. 4), a rear-facing rear cover (e.g., the first rear cover 380 and the second rear cover 390) of the electronic device 101, and a side bezel structure (e.g., the first side bezel structure 531 and the second side bezel structure 532) formed along the side surface of the electronic device 101.

According to an embodiment of the disclosure, the surface on which a display (e.g., the display 200 of FIGS. 2 and 3) is disposed is defined as a front surface of the electronic device 101. The opposite surface of the front surface is defined as a rear surface of the electronic device 101. Further, the surface surrounding the space between the front and rear surfaces is defined as a side surface of the electronic device 101. In the following embodiment, an upper end area P1 of the electronic device 101 (or the hinge structure (e.g., the hinge structure 700 of FIGS. 8 to 10)) may refer to an area facing in the +X-axis direction of the electronic device (or the hinge structure), and a lower end area P2 of the electronic device 101 (or the hinge structure) may refer to an area facing in the −X-axis direction of the electronic device (or the hinge structure). A middle area P3 of the electronic device 101 (or the hinge structure (e.g., the hinge structure 700 of FIGS. 8 to 10)) may refer to an area between the upper end area P1 and the lower end area P2.

The configuration of the first housing structure 310 and the second housing structure 320 of FIGS. 7A and 7B may be identical in whole or part to the configuration of the first housing structure 310 and the second housing structure 320 of FIGS. 2 to 4. The configuration of the hinge cover 330 of FIGS. 7A and 7B may be identical in whole or part to the configuration of the hinge cover 330 of FIGS. 2 to 4.

According to various embodiments, a rear cover (e.g., the first rear cover 380 or the second rear cover 390) of the electronic device 101 and a side bezel structure (e.g., the first side bezel structure 531 or the second side bezel structure 532) may include a non-conductive and/or conductive material. According to an embodiment, when the antenna structure 600 is disposed adjacent to the rear cover (e.g., the first rear cover 380 or the second rear cover 390) and/or the side bezel structure (e.g., the first side bezel structure 531 or the second side bezel structure 532), the antenna structure 600 may transmit/receive signals through the non-conductive portion.

According to various embodiments, the electronic device 101 may form a portion (e.g., an antenna radiator) of at least one legacy antenna (not shown) in the first housing structure 310 (or the second housing structure 320) and/or a portion (e.g., the first side bezel structure 531 or the second side bezel structure 532) of the first housing structure 310 (or the second housing structure 320). The at least one legacy antenna may be used for, e.g., cellular communication (e.g., 2G, 3G, 4G, or LTE), short-range communication (e.g., Wi-Fi, Bluetooth, or NFC), and/or GNSS.

According to various embodiments, the electronic device 101 may include a plurality of antenna structures 600 (e.g., the antenna structure 600 of FIGS. 6A to 6C) for forming a directional beam. For example, the electronic device 101 may include a first antenna structure 601 and a second antenna structure 602. The antenna structures 600 may be used for 5G network communication, mmWave communication, 60 GHz communication, or WiGig communication. The antenna structures 600 may be disposed to be spaced a predetermined distance or more apart from a partial area of a metal member (e.g., the first housing structure 310 (or the second housing structure 320)), an internal component, and/or other antennas (not shown).

Referring to FIG. 7A, when viewed to the rear surface (e.g., when viewed to the first or second rear cover 380 or 390) in the unfolded status of the foldable electronic device 101, the first antenna structure 601 may be positioned in an upper end area P1 on the left side (−Y-axis direction) of the second side bezel structure 532 in the second housing structure 320. As another example, the second antenna structure 602 may be positioned in the upper end area P1 of the hinge cover 330 positioned between the first housing structure 310 and the second housing structure 320. In an embodiment, in the electronic device 101, additional antenna structures may be placed in additional positions (e.g., the upper end area P1 on the right side (+Y-axis direction) of the electronic device 101 or the middle area P3) or some of the first antenna structure 601 and the second antenna structure 602 may be omitted.

According to various embodiments, the first antenna structure 601 and the second antenna structure 602 may be electrically connected with at least one communication processor (e.g., the processor 120 of FIG. 1) on the main circuit board (e.g., the board unit 520 of FIG. 4) using a conductive line (e.g., a coaxial cable or FPCB).

According to various embodiments, in the unfolded status of the foldable electronic device 101, the first antenna structure 601 and the second antenna structure 602 may radiate electromagnetic waves in the side direction and rear direction of the electronic device 101 so as to provide deflected beams. For example, in the unfolded status of the foldable electronic device 101, the first antenna structure 601 may radiate electromagnetic waves in the outer side direction of the second housing structure 320, and the second antenna structure 602 may radiate electromagnetic waves to the outside of the hinge cover 330 of the hinge module. The radiation direction of the first antenna structure 601 and the radiation direction of the second antenna structure 602 may be at least partially perpendicular to each other. Referring to FIG. 7B, in the folded status of the foldable electronic device 101, the antenna structures 600 may be positioned on two opposite sides of the electronic device 101 when viewed to the first rear cover 380 of the first housing structure 310 (or the second rear cover 390 of the second housing structure 320). According to an embodiment, in the folded status of the foldable electronic device 101, when viewed to the first rear cover 380 of the first housing structure 310, the first antenna structure 601 may be positioned on the upper end area P1 of the second side bezel structure 532 exposed to the right (+Y-axis direction) from the second housing structure 320. The second antenna structure 602 may be positioned in the upper end area P1 of the hinge module exposed to the left (−Y-axis direction). For example, the second antenna structure 602 may be disposed to face the hinge cover on one area of the hinge structure.

According to various embodiments, in the folded status of the foldable electronic device 101, the first antenna structure 601 and the second antenna structure 600 may radiate electromagnetic waves in both side directions of the electronic device 101 so as to provide deflected beams. For example, in the folded status of the foldable electronic device 101, the first antenna structure 601 may radiate electromagnetic waves in the outer side direction of the second housing structure 320, and the second antenna structure 602 may radiate electromagnetic waves in the outer side direction of the hinge cover 330 of the second housing structure 320. The radiation direction of the first antenna structure 601 and the radiation direction of the second antenna structure 602 may be at least partially substantially opposite to each other.

According to various embodiments of the disclosure, as one antenna structure (e.g., the first antenna structure 601) is mounted in an outer end area of the second housing structure 320 (or the first housing structure 310), and another antenna structure (e.g., the second antenna structure 602) is mounted in an area adjacent to the hinge cover 330, even in the folded status of the foldable electronic device 101, it is possible to implement a structure capable of antenna side radiation. As electromagnetic wave radiation is possible in both side directions in the folded status of the foldable electronic device 101, enhanced antenna performance may be provided without an overlap between the radiation areas of the antenna structures.

Figure 8:
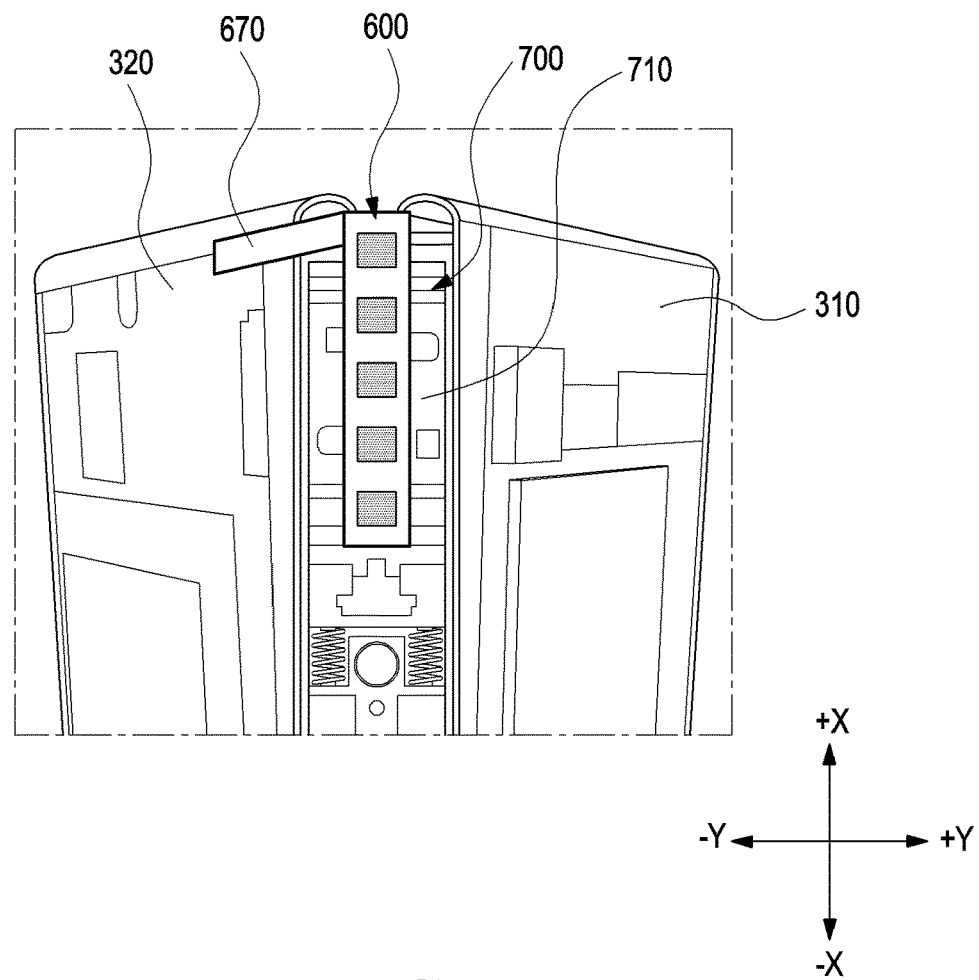
FIG. 8 is a see-through perspective view illustrating an antenna structure disposed in an area of a hinge structure in an intermediate state in which a foldable electronic device maintains a designated angle, according to various embodiments.

FIG. 8 is a see-through perspective view illustrating an antenna structure disposed in an area of a hinge structure in an intermediate state in which a foldable electronic device maintains a designated angle, according to various embodiments.

Figure 9:
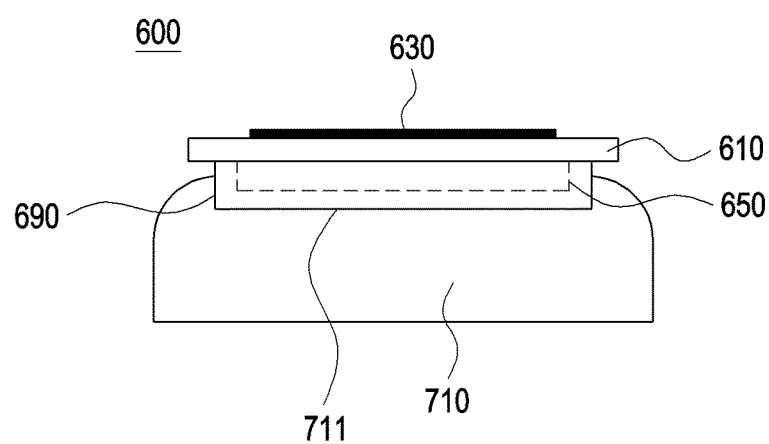
FIG. 9 is a side view illustrating an antenna structure disposed on a hinge structure of a foldable electronic device as viewed in one direction according to various embodiments.

FIG. 9 is a side view illustrating an antenna structure disposed on a hinge structure of a foldable electronic device as viewed in one direction according to various embodiments.

Figure 10:
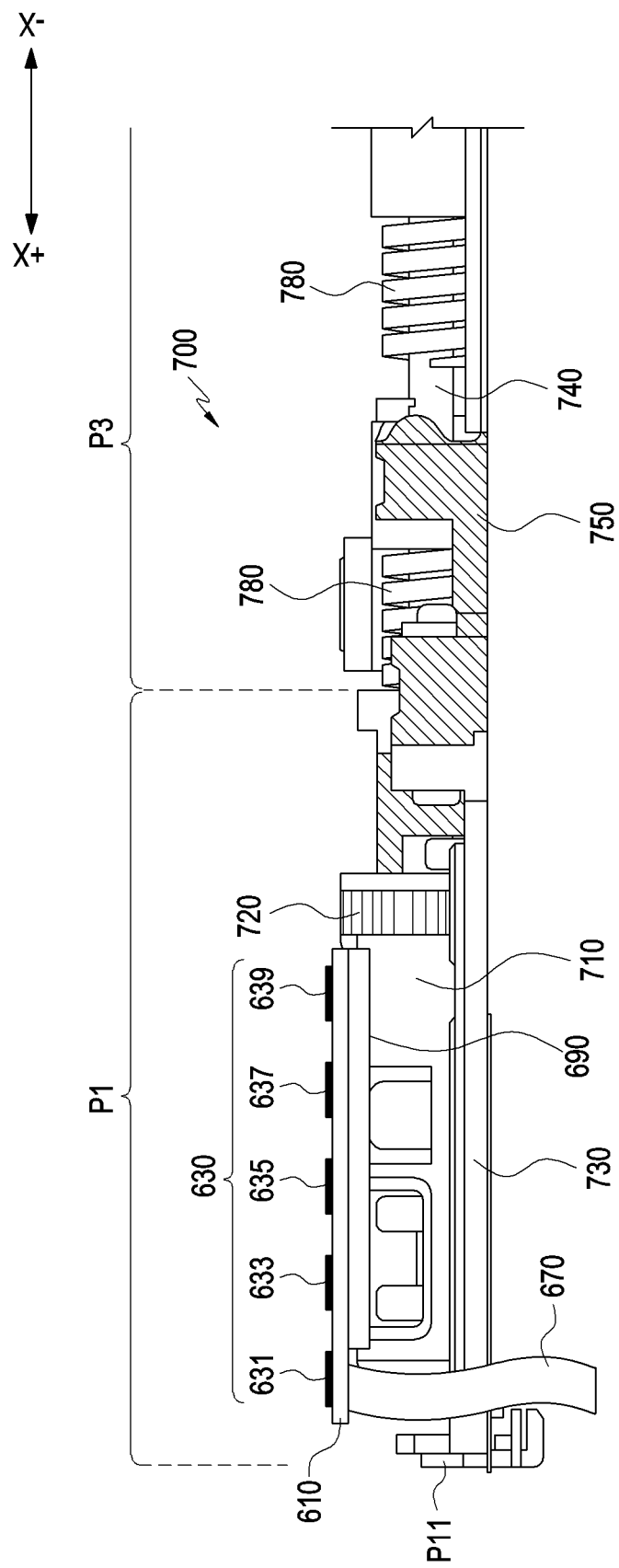
FIG. 10 is a side sectional view illustrating an antenna structure disposed on a hinge structure of a foldable electronic device as viewed in another direction according to various embodiments.

FIG. 10 is a side view illustrating an antenna structure disposed on a hinge structure of a foldable electronic device as viewed in another direction according to various embodiments.

Figure 11:
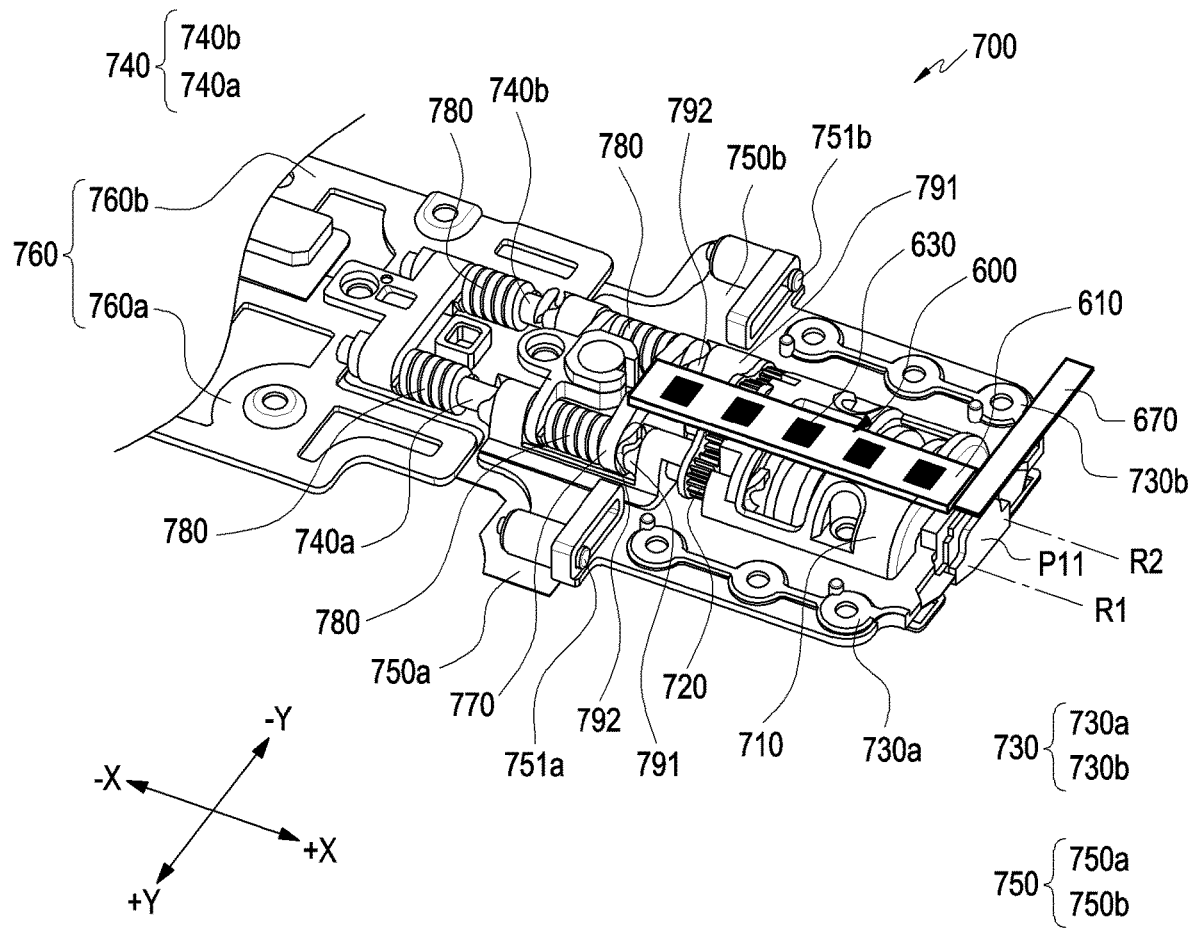
FIG. 11 is a perspective view illustrating a disposition relationship between a hinge structure of a foldable electronic device and a connecting member (e.g., a flexible circuit board) of an antenna structure according to various embodiments.

FIG. 11 is a perspective view illustrating a disposition relationship between a hinge structure of a foldable electronic device and a connecting member (e.g., a flexible circuit board) of an antenna structure according to various embodiments.

FIG. 8 is a view excluding the hinge case (e.g., the hinge case or cover 330 of FIG. 3) of the hinge module to indicate the position of the antenna structure 600. According to various embodiments, an electronic device (e.g., the electronic device 101 of FIGS. 1 to 4) may include a first housing structure 310, a second housing structure 320, a hinge structure 510, and/or an antenna structure 600.

The configuration of the first housing structure 310, the second housing structure 320, and the antenna structure 600 of FIGS. 8 to 11 may be identical in whole or part to the configuration of the first housing structure 310, the second housing structure 320, and the antenna structure 600 of FIGS. 7A and 7B.

According to various embodiments, the hinge module may include a hinge structure 700 and a hinge cover (e.g., the hinge case 330 of FIG. 3), and the hinge structure 700 may connect the first housing structure 310 and the second housing structure 320 to be pivotable from the folded status to the unfolded status. According to an embodiment, the hinge structure 700 may include a hinge bracket 710, a hinge gear 720, a rotation bracket 730 (e.g., a first rotation bracket 730a and a second rotation bracket 730b), a gear shaft 740 (e.g., a first gear shaft 740a and a second gear shaft 740b), and/or a hinge arm 750 (e.g., a first hinge arm 750a and a second hinge arm 750b). According to an embodiment, the hinge structure 700 may further include mounting members 760 (e.g., a first mounting member 760a and a second mounting member 760b), a connection structure 770 connecting gear shafts 740 (e.g., a first gear shaft 740a and a second gear shaft 740b), and/or a plurality of elastic members 780 coupled with the gear shafts 740 (e.g., the first gear shaft 740a and the second gear shaft 740b).

According to an embodiment, the hinge bracket 710 may be disposed to cover at least a portion of a rotation area of the hinge structure 700 (e.g., an interlocking portion of the first rotation bracket 730a and the second rotation bracket 730*b*). According to an embodiment, a plurality of (e.g., a pair or two pairs of) hinge gears 720 may be configured and may interlock the first housing structure 310 and the second housing structure 320 with each other using a structure in which the plurality of interlocking gears (e.g., spur gears) are sequentially engaged. For example, among the hinge gears 720, a first gear may be rotated as the first housing structure 310 pivots and, among the hinge gears 720, a second gear may be rotated in a different direction (e.g., opposite direction) from the first gear as the second housing structure 320 pivots. As another example, the rotation shaft (e.g., a first shaft R1) of the first gear may be disposed parallel with the rotation shaft (e.g., the second rotation shaft R2) of the second gear.

According to an embodiment, the rotation brackets 730*a* and 730*b* may be positioned in the housing structures 310 and 320 of the electronic device 101 and may be slidably fastened with the hinge arms 750*a* and 750*b* by the slide pins 751*a* and 751*b*. For example, the slide pins 751*a* and 751*b* may be coupled into holes formed in the ends of the hinge arms 750*a* and 750*b*, and the slide pins 751*a* and 751*b* may slide along the slide openings of the rotation brackets 730*a* and 730*b*.

According to an embodiment, the hinge structure 700 may include a first cam member 791 provided on the hinge arms 750*a* and 750*b* and a second cam member 792 of the connection structure 770 disposed on the gear shafts 740*a* and 740*b*. In an operation in which the electronic device 101 is unfolded or folded, the first cam member 791 may slidably contact the second cam member 792 to create a frictional force.

According to various embodiments, the antenna structure 600 may be disposed on one area of the hinge bracket 710 of the hinge structure 700. The antenna structure 600 may include an antenna circuit board 610, an antenna array 630, and a communication circuit 650 (e.g., an RFIC and/or a PMIC). According to an embodiment, the antenna structure 600 may further include a shielding member 690. According to various embodiments, at least one of the above-mentioned components may be omitted, or at least two of the components may be integrally formed with each other.

According to an embodiment, the antenna circuit board 610 may include a plurality of conductive layers and a plurality of non-conductive layers alternately stacked with the conductive layers. Electronic components arranged on, or outside of, the antenna circuit board 610 may be electrically connected together via wires and conductive vias formed on or through the conductive layers. According to an embodiment, the antenna array 630 may include a plurality of antenna elements 631, 633, 635, 637, or 639 (e.g., the plurality of antenna elements 432, 434, 436, or 438 of FIGS. 6A and 6C) arranged to form a directional beam. The antenna elements 631, 633, 635, 637, or 639 may be formed on the first surface of the antenna circuit board 610 as illustrated. According to an embodiment, the antenna array 630 may be formed inside the antenna circuit board 610. According to embodiments, the antenna array 630 may include a plurality of antenna arrays (e.g., a dipole antenna array and/or a patch antenna array) of the same or different shapes or kinds.

According to an embodiment, the RFIC (e.g., the RFIC 452 of FIG. 6B) may be disposed in another area (e.g., a second surface opposite to the first surface) of the antenna circuit board 610 which is spaced apart from the antenna array 630. The RFIC is configured to be able to process signals of a selected frequency band which are transmitted or received via the antenna array 630.

According to an embodiment, the PMIC (e.g., the PMIC 454 of FIG. 6B) may be disposed in another portion (e.g., the second surface) of the PCB 610 which is spaced apart from the antenna array. The PMIC may receive a voltage from the main circuit board and provide necessary power to various components (e.g., the RFIC) on the antenna structure.

According to an embodiment, the shielding member 690 (e.g., the shielding member 490 of FIG. 6B) may be disposed on a portion (e.g., the second surface) of the antenna circuit board 610 to electromagnetically shield off at least one of the RFIC or the PMIC. According to an embodiment, the shielding member 690 may include a shield can.

According to various embodiments, the antenna structure 600 may be positioned on the hinge structure 700. According to an embodiment, a recess 711 may be formed in one area of the hinge bracket 710, and a portion of the antenna structure 600 may be inserted into the recess. For example, the recess 711 of the hinge bracket 710 may have an inwardly dug recess shape, and at least a portion of the communication circuit 650 of the antenna structure 600 and/or the shielding member 690 formed to shield the communication circuit 650 may be seated in the recess. According to an embodiment, the hinge bracket 710 may be formed of a metallic material, and at least a portion thereof may be connected to the first housing structure 310 (and/or the second housing structure 320) directly or through a surrounding structure to provide a path (e.g., a heat dissipation path) through which the heat generated from the antenna structure 600 is dissipated. For example, as one surface of the communication circuit (and/or the shielding member 690 formed to shield the communication circuit 650) is overall disposed to contact in the recess 711 of the hinge bracket 710, the heat generated from the communication circuit 650 may be directly transferred to the hinge bracket 710 and may thus be easily dissipated to other structures or the outside.

According to various embodiments, the antenna structure 600 may be electrically connected with another printed circuit board (e.g., the board unit 520 of FIG. 4) through a module interface. The module interface may include a connecting member 670, e.g., at least one of a coaxial cable connector, a board-to-board connector, an interposer, or a flexible printed circuit board (FPCB). For example, in the antenna circuit board 610, the communication circuit 650 (e.g., the RFIC and/or the PMIC) of the antenna structure 600 may be electrically connected with the main circuit board disposed in the second housing structure 320 (or the first housing structure 310) through the connecting member 670.

In an embodiment, an upper end area P1 of the electronic device 101 (or the hinge structure 700 may refer to an area facing in the +X-axis direction of the electronic device 101 (or the hinge structure 700), and a lower end area P2 of the electronic device 101 (or the hinge structure 700) may refer to an area facing in the −X-axis direction of the electronic device 101 (or the hinge structure 700). A middle area P3 of the electronic device 101 (or the hinge structure 700) may refer to an area between the upper end area P1 and the lower end area.

According to various embodiments, at least a portion of the antenna structure 600 may be positioned in one area (e.g., the upper end area P1) of the hinge bracket 710. For example, in the hinge structure 700, the hinge bracket 710, the hinge gear 720, and the connection structure 770 disposed in the space formed inside the hinge arm 750 may be sequentially positioned with respect to the upper end P11 facing in the +X-axis direction. The elastic member 780 may be positioned along the rotation axes R1 and R2 adjacent to the connection structure 770. A first end of the antenna circuit board 610 of the antenna structure 600 may be positioned on the upper end P11 of the hinge structure 700, and a second end, opposite to the first end, of the antenna circuit board 610 may be positioned on the connection structure 770 connecting the gear shafts 740a and 740b.

As another example, the length of the antenna circuit board 610 of the antenna structure 600 may be designed to correspond to the length of the hinge bracket 710 or to be larger than the length of the hinge bracket 710, and at least a portion of the antenna circuit board 610 may be disposed to face one area of the hinge bracket 710. According to an embodiment, the connecting member 670 may extend from the first end of the antenna circuit board 610, for example, extending to be adjacent to the upper end P11 of the hinge structure 700, to extend to the inside of the second housing structure 320 (or the first housing structure 310). In an embodiment, the connecting member 670 may be disposed in a direction substantially perpendicular to the antenna circuit board 610.

Figure 12:
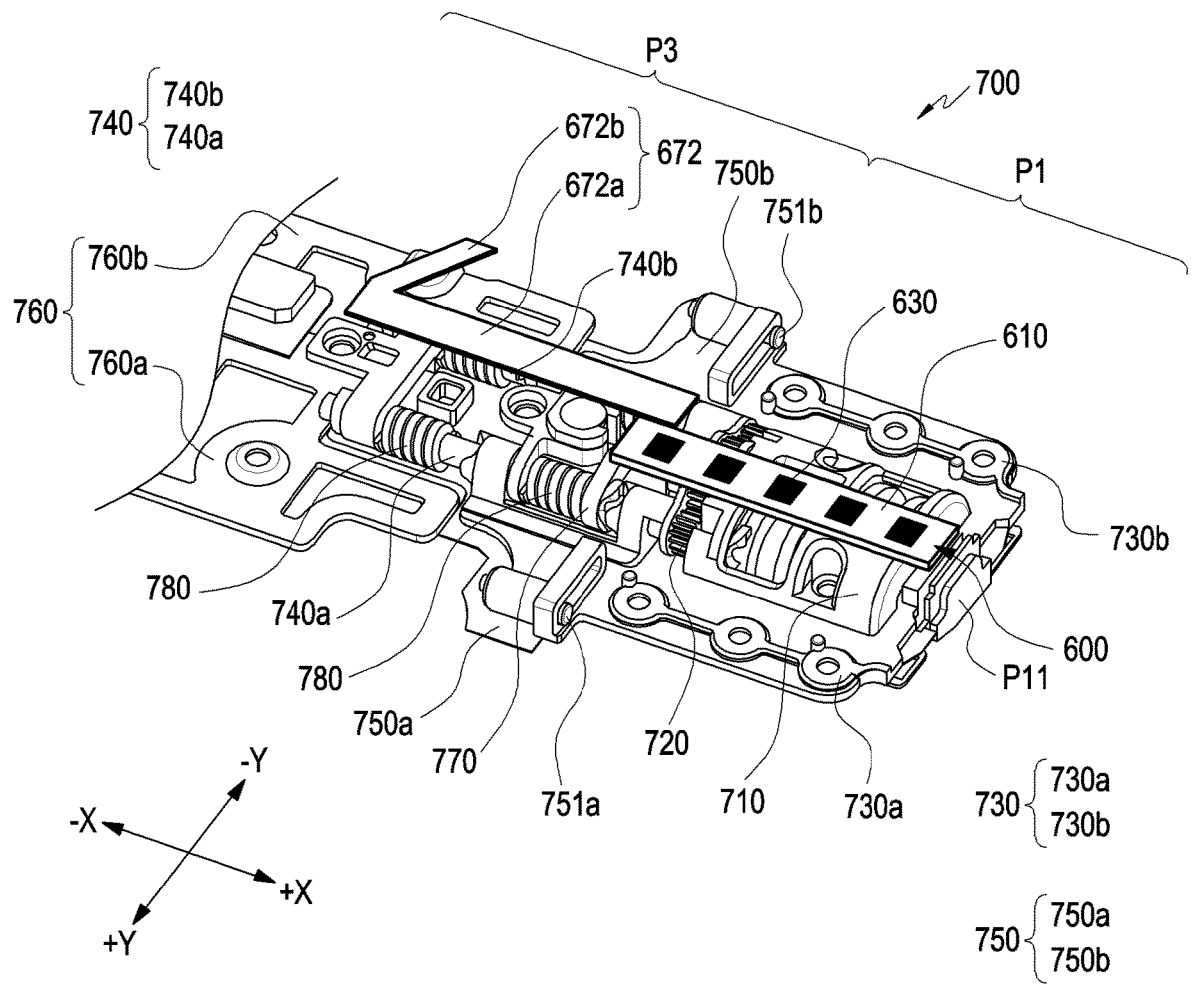
FIG. 12 is a perspective view illustrating a disposition relationship between a hinge structure of a foldable electronic device and a connecting member (e.g., a flexible circuit board) of an antenna structure according to various embodiments.

FIG. 12 is a perspective view illustrating a disposition relationship between a hinge structure of a foldable electronic device and a connecting member (e.g., a flexible circuit board) of an antenna structure according to various embodiments.

According to various embodiments, an electronic device (e.g., the electronic device 101 of FIGS. 1 to 4) may include a hinge structure 510 and/or an antenna structure 600. The configuration of the hinge structure 700 and the antenna structure 600 of FIG. 12 may be identical in whole or part to the configuration of the hinge structure 700 and the antenna structure 600 of FIGS. 8 to 11.

According to various embodiments, the hinge structure 700 may include a hinge bracket 710, a hinge gear 720, a rotation bracket 730 (e.g., a first rotation bracket 730a and a second rotation bracket 730b), a gear shaft 740 (e.g., a first gear shaft 740a and a second gear shaft 740b), and/or a hinge arm 750 (e.g., a first hinge arm 750a and a second hinge arm 750b). According to an embodiment, the rotation brackets 730a and 730b may be positioned in the housing structures 310 and 320 of the electronic device 101 and may be slidably fastened with the hinge arms 750a and 750b by the slide pins 751a and 751b. For example, the slide pins 751a and 751b may be coupled into holes formed in the ends of the hinge arms 750a and 750b, and the slide pins 751a and 751b may slide along the slide openings of the rotation brackets 730a and 730b.

According to an embodiment, the hinge structure 700 may further include mounting members 760 (e.g., a first mounting member 760a and a second mounting member 760b), a connection structure 770 connecting gear shafts 740 (e.g., a first gear shaft 740a and a second gear shaft 740b), and/or a plurality of elastic members 780 coupled with the gear shafts 740 (e.g., the first gear shaft 740a and the second gear shaft 740b).

Hereinafter, the disposition relationship of the connecting member 670 of the antenna structure 600, which is different from that of FIG. 11, is described.

In an embodiment, an upper end area P1 of the hinge structure 700 may refer to an area facing in the +X-axis direction of the hinge structure 700, and a lower end area P2 of the hinge structure 700 may refer to an area facing in the −X-axis direction of the hinge structure 700. A middle area P3 of the hinge structure 700 may refer to an area between the upper end area P1 and the lower end area.

According to various embodiments, the antenna structure 600 may be disposed on one area of the hinge bracket 710 of the hinge structure 700. The antenna structure 600 may include an antenna circuit board 610, an antenna array 630, a communication circuit (not shown) (e.g., an RFIC and/or a PMIC), and a connecting member 672.

According to various embodiments, the antenna structure 600 may be positioned in one area of the hinge bracket 710. The antenna circuit board 610 of the antenna structure 600 may extend from the hinge bracket 710 positioned in the upper end area P1 of the hinge structure 700 to the middle area P3 of the hinge structure 700. The hinge arms 750 (e.g., the first hinge arm 750a and the second hinge arm 750b), the mounting members 760 (e.g., the first mounting member 760a and the second mounting member 760b), and the elastic member 780 may be disposed in the middle area P3 of the hinge structure 700, and it has a relatively space margin as compared with the upper end area P1 where the hinge bracket 710 is disposed, making it possible to easily secure a path through which the connecting member 672 passes.

According to various embodiments, the connecting member 672 of the antenna structure 600 may extend from one end of the antenna circuit board 610 of the antenna structure 600 to the inside of the second housing structure 320 (or the first housing structure 310). For example, a first end of the antenna circuit board 610 of the antenna structure 600 may be positioned on the upper end P11 of the hinge structure 700, a second end of the antenna circuit board 610 may be positioned in the middle area P3 of the hinge structure 700, and the connecting member 672 may extend from the second end.

According to an embodiment, the connecting member 672 may include a first portion 672a disposed in a direction parallel with the antenna circuit board 610 and a second portion 672b extending from the first portion 672a and disposed in a direction substantially perpendicular to the first portion 672a (or the antenna circuit board 610). The second portion 672b may be positioned in the middle area P3 of the hinge structure 700 and may extend from the empty space of the hinge structure 700 to the inside of the second housing structure 320 (or the first housing structure 310). In the foldable electronic device 101, a separate first circuit board for connecting the main circuit board (e.g., the printed circuit board 521 of FIG. 4) in the first housing structure 310 and the main circuit board (e.g., the printed circuit board 522 of FIG. 4) in the second housing structure 320 may be electrically connected through a space in the middle portion of the hinge structure 700, and the connecting member 670 of the hinge structure 700 may extend to the inside of the second housing structure 320 (or the first housing structure 310) using the space.

Figure 13:
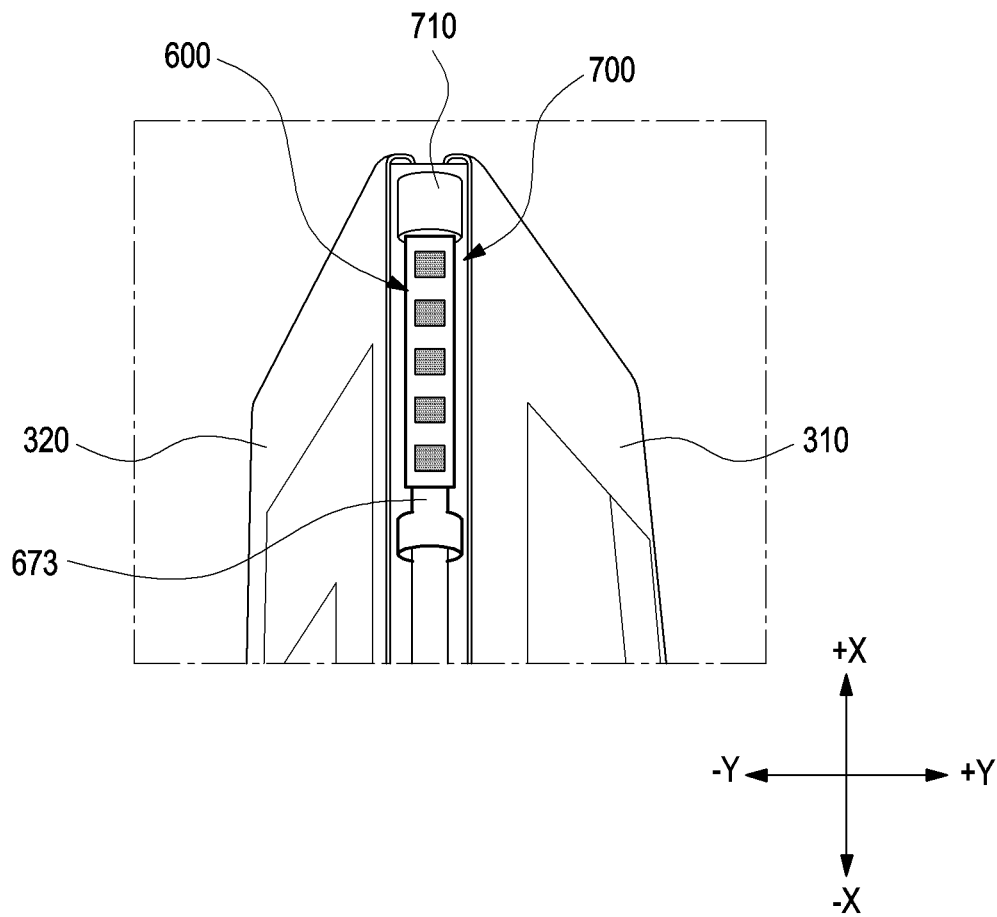
FIG. 13 is a see-through perspective view illustrating an antenna structure disposed in an area of a hinge structure in an intermediate state in which a foldable electronic device maintains a designated angle, according to various embodiments.

FIG. 13 is a see-through perspective view illustrating an antenna structure disposed in an area of a hinge structure in an intermediate state in which a foldable electronic device maintains a designated angle, according to various embodiments.

Figure 14:
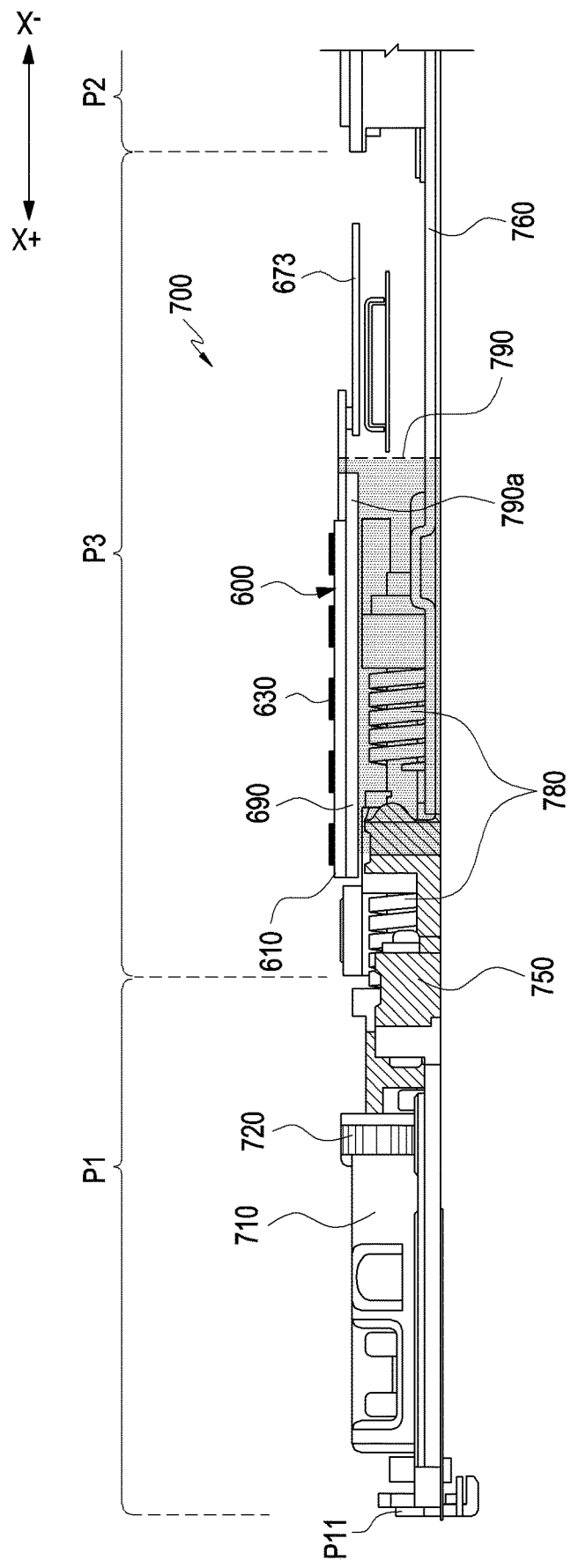
FIG. 14 is a side sectional view illustrating an antenna structure disposed on a hinge structure of a foldable electronic device according to various embodiments.

FIG. 14 is a side sectional view illustrating an antenna structure disposed on a hinge structure of a foldable electronic device according to various embodiments.

Figure 15:
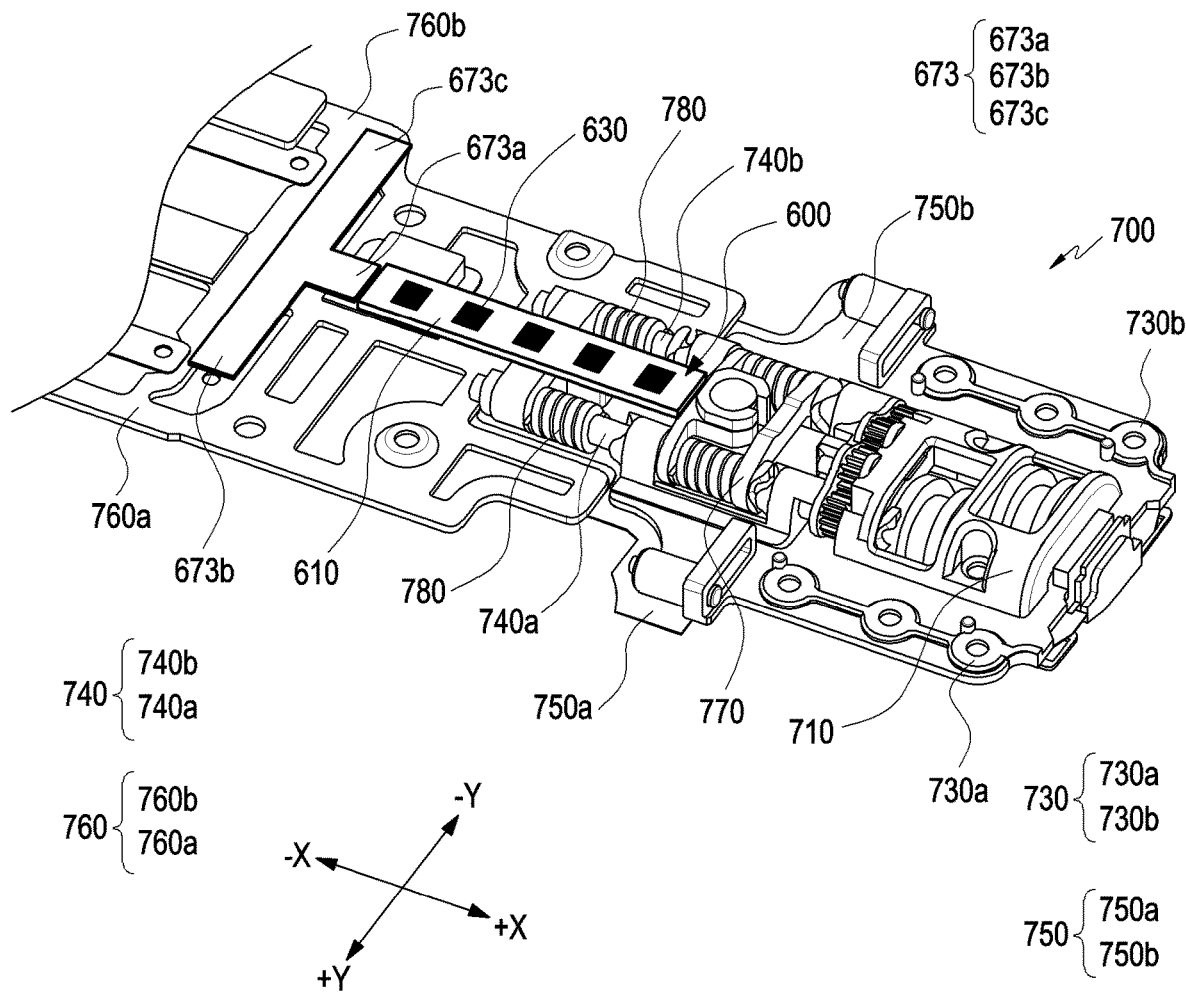
FIG. 15 is a perspective view illustrating a disposition relationship between a hinge structure of a foldable electronic device and a connecting member (e.g., a flexible circuit board) of an antenna structure according to various embodiments.

FIG. 15 is a perspective view illustrating a disposition relationship between a hinge structure of a foldable electronic device and a connecting member (e.g., a flexible circuit board) of an antenna structure according to various embodiments.

FIG. 13 is a view excluding the hinge case (e.g., the hinge case 330 of FIG. 3) of the hinge module to indicate the position of the antenna structure 600. According to various embodiments, an electronic device (e.g., the electronic device 101 of FIGS. 1 to 4) may include a first housing structure 310, a second housing structure 320, a hinge structure 700, and/or an antenna structure 600.

The configuration of the first housing structure 310 and the second housing structure 320 of FIGS. 13 to 15 may be identical in whole or part to the configuration of the first housing structure 310 and the second housing structure 320 of FIGS. 7A and 7B. The configuration of the hinge structure 700 and the antenna structure 600 of FIGS. 13 to 15 may be identical in whole or part to the configuration of the hinge structure 700 and the antenna structure 600 of FIGS. 8 to 11.

According to various embodiments, the hinge structure 700 may include a hinge bracket 710, a hinge gear 720, a rotation bracket 730 (e.g., a first rotation bracket 730a and a second rotation bracket 730b), a gear shaft 740 (e.g., a first gear shaft 740a and a second gear shaft 740b), and/or a hinge arm 750 (e.g., a first hinge arm 750a and a second hinge arm 750b). According to an embodiment, the hinge structure 700 may further include mounting members 760 (e.g., a first mounting member 760a and a second mounting member 760b), a connection structure 770 connecting gear shafts 740 (e.g., a first gear shaft 740a and a second gear shaft 740b), and/or a plurality of elastic members 780 coupled with the gear shafts 740 (e.g., the first gear shaft 740a and the second gear shaft 740b).

Hereinafter, the disposition relationship of the connecting member 673 of the antenna structure 600, which is different from that of FIG. 11, is described.

In an embodiment, an upper end area P1 of the hinge structure 700 may refer to an area facing in the +X-axis direction of the hinge structure 700, and a lower end area P2 of the hinge structure 700 may refer to an area facing in the −X-axis direction of the hinge structure 700. A middle area P3 of the hinge structure 700 may refer to an area between the upper end area P1 and the lower end area P2.

According to various embodiments, the antenna structure 600 may be disposed on one area of the hinge structure 700. The antenna structure 600 may include an antenna circuit board 610, an antenna array 630, a communication circuit (not shown) (e.g., an RFIC and/or a PMIC), and a connecting member 673.

According to various embodiments, the antenna structure 600 may be disposed in the middle area P3 of the hinge structure 700. For example, the antenna structure 600 may be disposed in an area adjacent to the elastic member 780, which is spaced apart from the hinge bracket 710 positioned in the upper end area P1 of the hinge structure 700. As another example, the antenna bracket 790 may be disposed to cover the elastic member 780 disposed in the middle area P3 of the hinge structure 700. A recess 790a may be formed in an area of the antenna bracket 790, and an area of the antenna structure 600 may be inserted into the recess 790a. According to an embodiment, as the area where the elastic member 780 is disposed is formed with a lower thickness (e.g., height) than the area where the hinge bracket 710 is disposed, with respect to one surface (e.g., the bottom surface) of the hinge structure 700, a space margin may be secured inside the hinge structure 700. This may provide an advantage in mounting the antenna structure 600.

According to an embodiment, the recess 790a of the antenna bracket 790 may have an inwardly dug recess shape, and at least a portion of the communication circuit 650 of the antenna structure 600 and/or the shielding member (not shown) formed to shield the communication circuit 650 may be seated in the recess. According to an embodiment, the hinge bracket 710 may be formed of a metallic material, and at least a portion thereof may be connected to the first housing structure 310 (and/or the second housing structure 320) to provide a path through which the heat generated from the antenna structure 600 is dissipated.

According to various embodiments, the antenna circuit board 610 of the antenna structure 600 may extend from the elastic member 780 positioned in the middle area of the hinge structure 700 to the mounting member 760 (e.g., the first mounting member 760a and the second mounting member 760b). The area where the mounting member 760 of the hinge structure 700 is disposed has a relatively space margin as compared with the other area of the hinge structure 700, making it possible to easily secure a path through which the connecting member 673 passes.

According to various embodiments, the connecting member 673 of the antenna structure 600 may extend from one end of the antenna circuit board 610 of the antenna structure 600 to the inside of the second housing structure 320 (or the first housing structure 310). For example, a first end of the antenna circuit board 610 of the antenna structure 600 may be positioned to face the upper end P11 of the hinge structure 700, and a second end of the antenna circuit board 610 may be positioned to face the lower end of the hinge structure 700, and the connecting member 673 may extend from the second end.

According to an embodiment, the connecting member 673 may include a first portion 673a disposed in a direction parallel with the antenna circuit board 610, a second portion 673a branched from an end of the first portion 673a and extending to face the first housing structure 310, and a third portion 673c branched from an end of the first portion 673a and extending to face the second housing structure 320. For example, the second portion 673b and/or the third portion 673c may be disposed in a direction substantially perpendicular to the first portion 673a (or the antenna circuit board 610).

According to an embodiment, the connecting member 673 may be a portion of a separate flexible circuit board for connecting the main circuit board (e.g., the printed circuit board 521 of FIG. 4) in the first housing structure 310 and the main circuit board (e.g., the printed circuit board 522 of FIG. 4) in the second housing structure 320. For example, a partial area of the separate flexible circuit board disposed to cross the hinge structure 700 may be designed to face the antenna structure 600. Thus, it is possible to electrically connect the main circuit board (e.g., the printed circuit board 521 of FIG. 4) in the second housing structure 320 and the antenna structure 600 directly without manufacturing an additional board. As another example, the connecting member 673 of the antenna structure 600 may be manufactured in a 'T' shape when viewed from thereabove in the unfolded status of the foldable electronic device 101.

Figure 16:
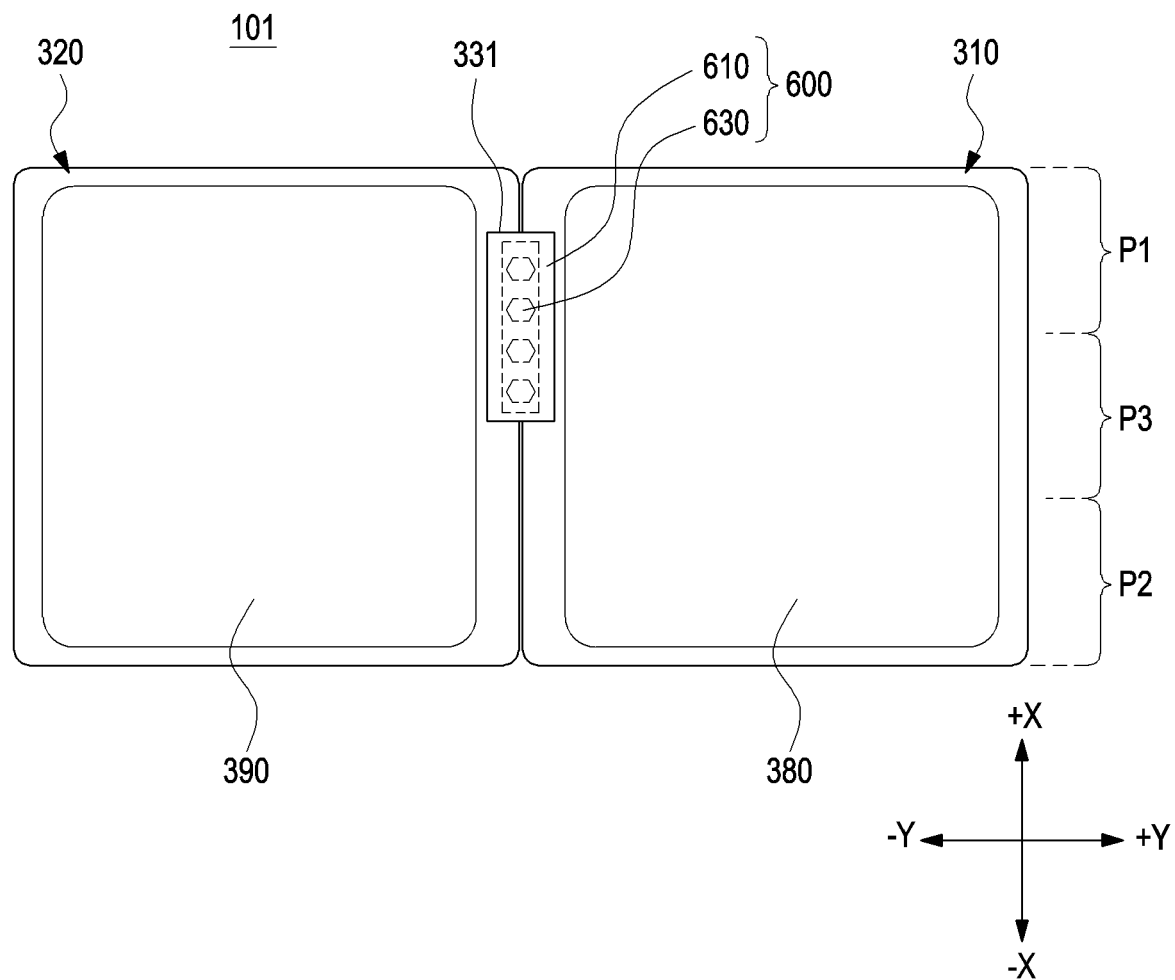
FIG. 16 is a see-through view illustrating an antenna structure disposed in one area of a hinge structure in an unfolded state of a foldable electronic device according to various embodiments.

FIG. 16 is a see-through view illustrating an antenna structure disposed in one area of a hinge structure in an unfolded state of a foldable electronic device according to various embodiments.

Figure 17:
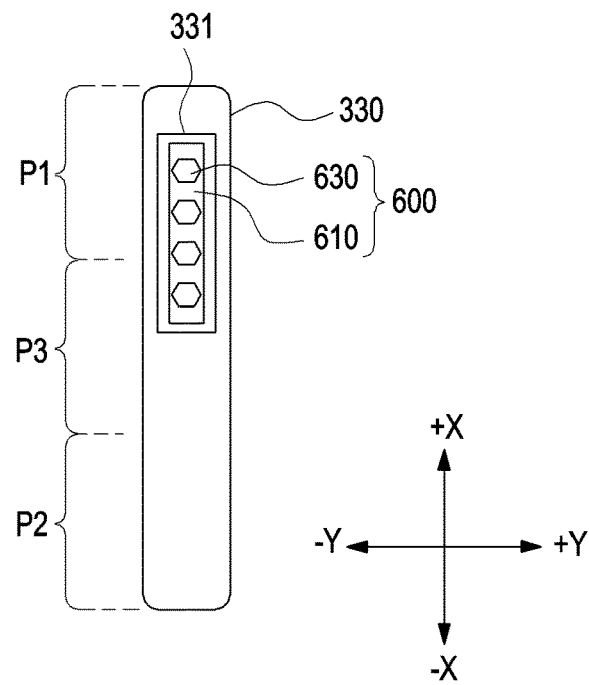
FIG. 17 is a diagram illustrating an antenna structure disposed in one area of a hinge structure in an unfolded state of a foldable electronic device according to various embodiments.

FIG. 17 is a diagram illustrating an antenna structure disposed in one area of a hinge structure in a folded state of a foldable electronic device according to various embodiments.

Figure 18:
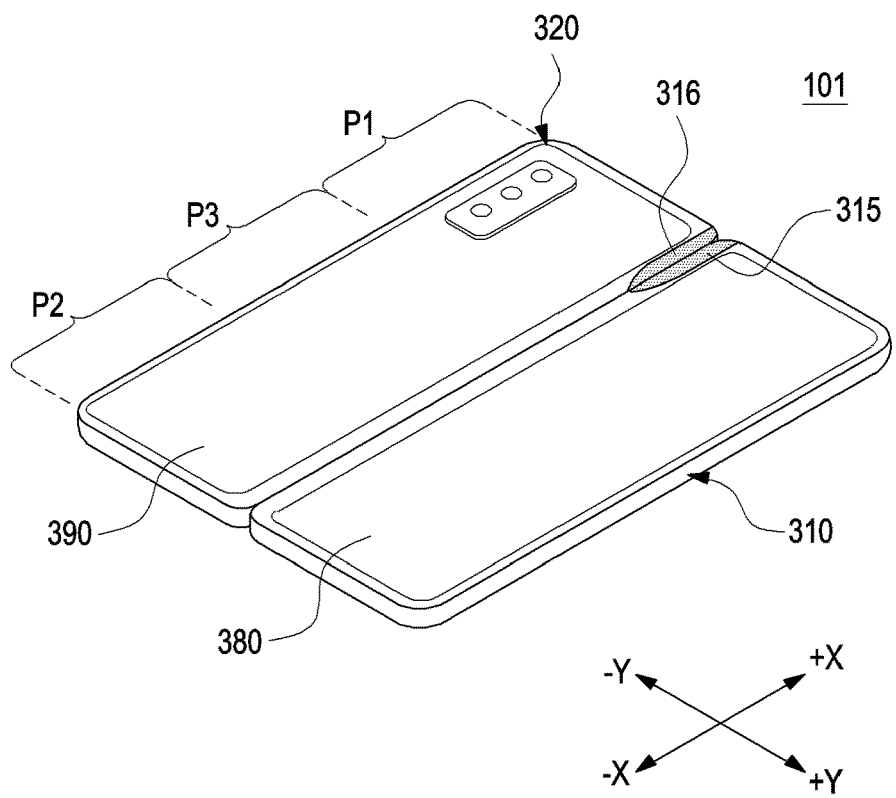
FIG. 18 is a perspective view illustrating an area of a hinge structure in an unfolded state of a foldable electronic device according to various embodiments.

FIG. 18 is a perspective view illustrating an area of a hinge structure in an unfolded state of a foldable electronic device according to various embodiments.

According to various embodiments, an electronic device (e.g., the electronic device 101 of FIGS. 1 to 4) may include a first housing structure 310, a second housing structure 320, a hinge cover 330, and/or an antenna structure 600. FIG. 16 is a see-through view illustrating some components of the hinge cover 330 which are not exposed to the outside in the unfolded status of the electronic device 101.

The configuration of the first housing structure 310 and the second housing structure 320 of FIGS. 16 to 18 may be identical in whole or part to the configuration of the first housing structure 310 and the second housing structure 320 of FIGS. 7A and 7B. The configuration of the antenna structure 600 of FIGS. 16 to 18 may be identical in whole or part to the configuration of the antenna structure 600 of FIGS. 8 to 11.

In an embodiment, an upper end area P1 of the electronic device 101 (or the hinge structure 700 may refer to an area facing in the +X-axis direction of the electronic device 101 (or the hinge structure 700), and a lower end area P2 of the electronic device 101 (or the hinge structure 700) may refer to an area facing in the −X-axis direction of the electronic device 101 (or the hinge structure 700). A middle area P3 of the electronic device 101 (or the hinge structure 700) may refer to an area between the upper end area P1 and the lower end area.

According to various embodiments, the hinge module may include a hinge structure (e.g., the hinge structure 700 of FIGS. 10 and 11) and a hinge cover 330 that covers at least a portion of the hinge structure 700. According to an embodiment, in the unfolded status of the foldable electronic device 101, the hinge cover 330 may be hidden, and thus not exposed to the outside, by the first housing structure 310 and the second housing structure 320. In the folded status of the foldable electronic device 101, as the first housing structure 310 and the second housing structure 320 slide to both sides with respect to the hinge structure 700, the hinge cover 330 may be exposed to the outside.

According to various embodiments, to facilitate antenna radiation in the unfolded status and/or folded status of the foldable electronic device 101, a portion of the hinge cover 330 and a portion of the first and second housing structures 310 and 320 may be formed of a non-metallic area.

According to an embodiment, in the unfolded status of the foldable electronic device 101, a portion of the first and second housing structures 310 and 320 may be disposed to face the antenna structure 600 disposed on the hinge structure 700. For example, the upper end area P1 (or middle area P3) of the first housing structure 310 facing the antenna structure 600 may be manufactured to include a first insulating portion 315. To form the first insulating portion 315, an area of the first housing structure 310 formed of a metallic material may be formed with an opening and may then be formed of a non-metallic material through a dual injection process. As another example, the upper end area P1 (or middle area P3) of the second housing structure 320 facing the antenna structure 600 may be manufactured to include a second insulating portion 316. To form the second insulating portion 316, an area of the second housing structure 320 formed of a metallic material may be formed with an opening and may then be formed of a non-metallic material through a dual injection process. In the unfolded status of the foldable electronic device 101, when viewed from the rear, the array 630 of multiple antennas of the antenna structure 600 may be disposed to overlap the first insulating portion 315 and/or the second insulating portion 316.

According to an embodiment, in the unfolded status and/or folded status of the foldable electronic device 101, a portion of the hinge cover 330 may be disposed to face the antenna structure 600 disposed on the hinge structure 700. For example, the portion (e.g., a third insulating portion 331) of the hinge cover 330 is a portion covering the upper end area P1 of the hinge structure 700 and may be formed to be open or formed of a non-metallic material to facilitate electromagnetic wave radiation from the antenna structure (e.g., the antenna array 630) disposed in the upper end area of the hinge structure 700. To form the third insulating portion 331, an area of the hinge cover 330 formed of a metallic material may be formed with an opening and may then be formed of a non-metallic material through a dual injection process.

According to an embodiment, in the unfolded status of the foldable electronic device 101, when viewed from the rear, the plurality of antenna elements may be disposed to overlap the third insulating portion 331. Since in the unfolded status of the foldable electronic device 101, the hinge cover 330 is hidden by the first and second housing structures 310 and 320, the antenna electromagnetic waves may pass through the third insulating portion 331 of the hinge cover 330 and may then be radiated through the first insulating portion 315 and/or the second insulating portion 316 to the outside.

According to an embodiment, in the folded status of the foldable electronic device 101, when viewed from the hinge cover 330, the plurality of antenna elements may be disposed to overlap the third insulating portion 331 of the hinge cover 330 exposed to the outside. As the first and second housing structures 310 and 320 are moved in the folded status of the foldable electronic device 101, since the hinge cover 330 is in the state of being directly exposed to the outside, the antenna electromagnetic waves may be radiated through the third insulating portion 331 regardless of the first insulating portion 315 and/or the second insulating portion 316 of the first and second housing structures 310 and 320.

According to various embodiments, according to the section where the foldable electronic device 101 operates from the unfolded status to the folded status, the antenna structure 600 disposed on the hinge structure 700 may be covered or opened by the insulating portion (e.g., the first and second insulating portions 315 and 316). For example, in the unfolded status of the foldable electronic device 101, the antenna structure 600 may be covered by the insulating portion (e.g., the first and second insulating portions 315 and 316). As another example, in the folded status of the foldable electronic device 101, when the insulating portion (e.g., the first and second insulating portions 315 and 316) may be moved to the outside of the hinge cover 330, and an area (e.g., the area facing the antenna structure 600) of the hinge cover 300 is opened, the antenna structure 600 may be opened. According to an embodiment, when the antenna structure 600 is covered by the first and second insulating portions 315 and 316, the plurality of antenna elements of the antenna structure 600 may provide beamforming to which a first phase shifter (PS) parameter has been applied. According to an embodiment, as the antenna structure 600 is spaced apart from the first and second insulating portions 315 and 316 and thus it is opened, the plurality of antenna elements of the antenna structure 600 may provide beamforming to which a second phase shifter (PS) parameter, different from the first PS parameter, has been applied.

Figure 19:
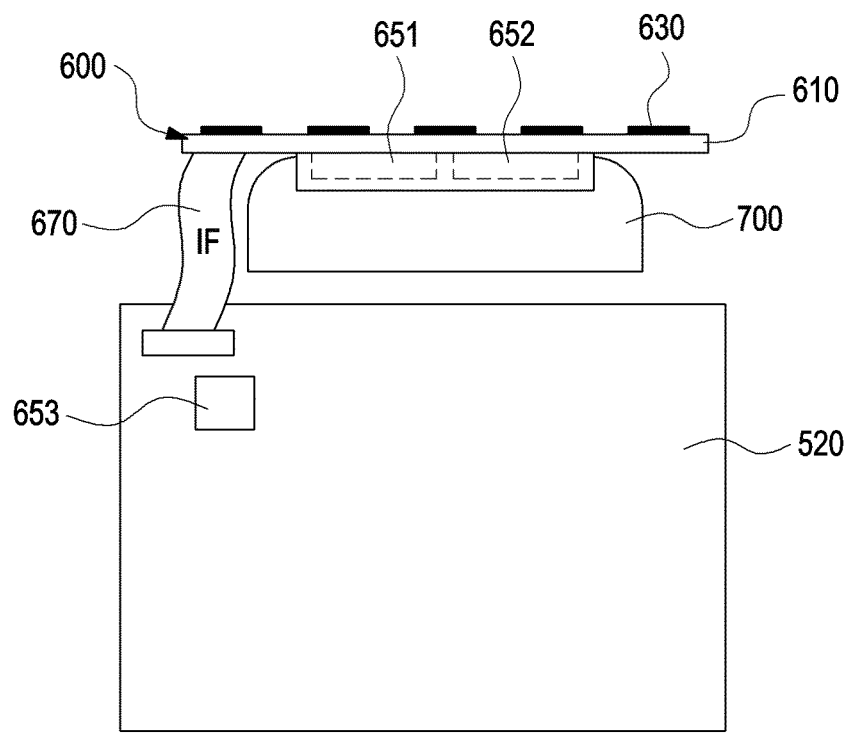
FIG. 19 is a diagram illustrating an antenna structure disposed in an area of a foldable electronic device according to various embodiments.
Figure 20:
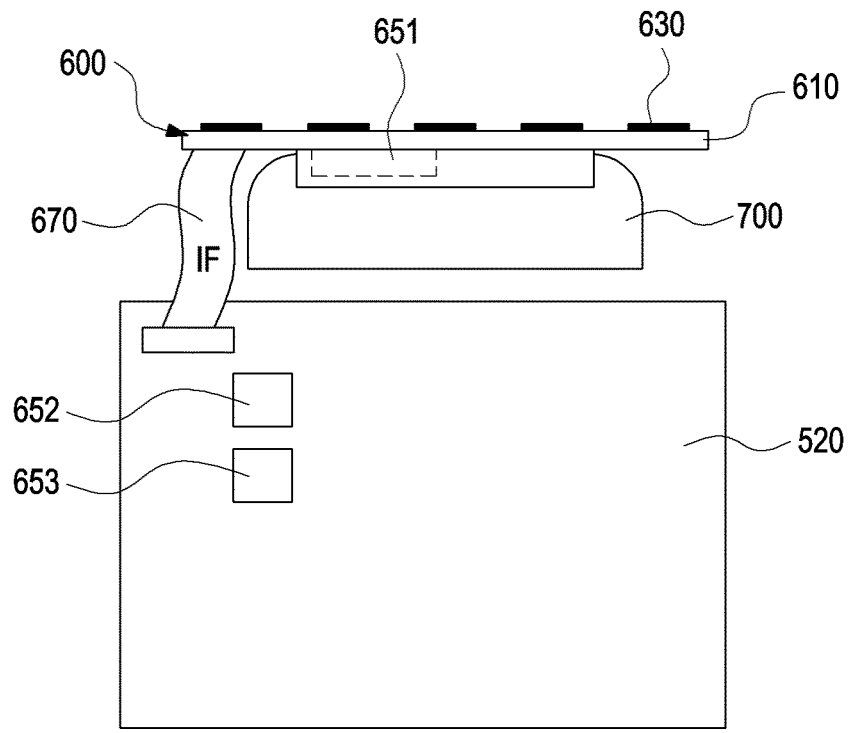
FIG. 20 is a diagram illustrating an antenna structure disposed in an area of a foldable electronic device according to various embodiments.
Figure 21:
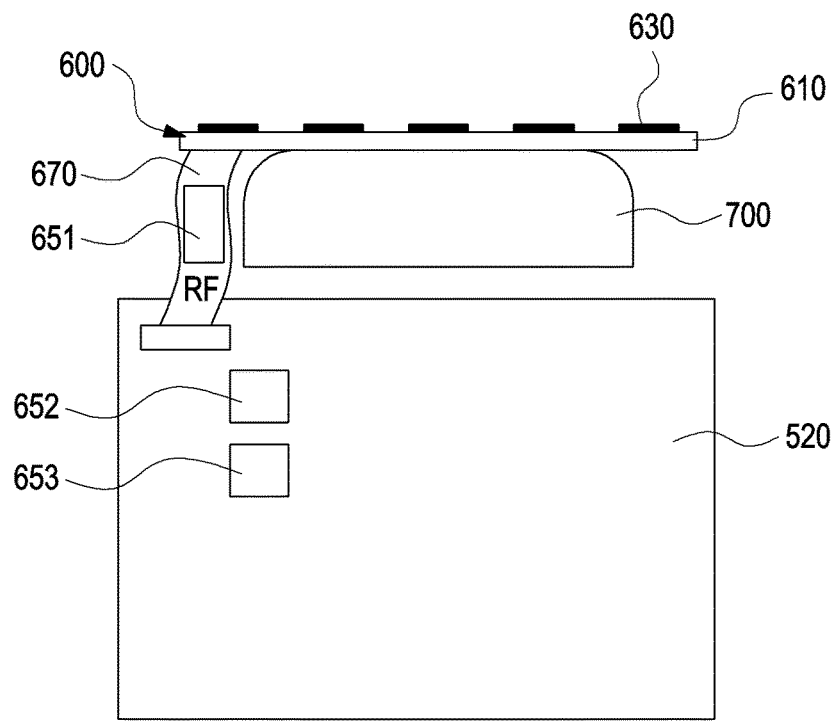
FIG. 21 is a diagram illustrating an antenna structure disposed in an area of a foldable electronic device according to various embodiments.

FIG. 19 is a diagram illustrating an antenna structure disposed in an area of a foldable electronic device according to various embodiments. FIG. 20 is a diagram illustrating an antenna structure disposed in an area of a foldable electronic device according to various embodiments. FIG. 21 is a diagram illustrating an antenna structure disposed in an area of a foldable electronic device according to various embodiments of the disclosure.

According to various embodiments, an electronic device (e.g., the electronic device 101 of FIGS. 1 to 4) may include a main circuit board 520, a hinge structure 700, and an antenna structure 600.

The configuration of the main circuit board 520 of FIGS. 19 to 21 may be identical in whole or part to the configuration of the printed circuit board 521 in the first housing structure (e.g., the first housing structure 310 of FIG. 4) of FIG. 4 or the printed circuit board 522 in the second housing structure (e.g., the second housing structure 320 of FIG. 4). The configuration of the hinge structure 700 and the antenna structure 600 of FIGS. 19 to 21 may be identical in whole or part to the configuration of the hinge structure 700 and the antenna structure 600 of FIGS. 8 to 11.

Referring to FIG. 19, the antenna structure 600 may be disposed in one area of the hinge structure 700, and the antenna structure 600 may include an antenna circuit board 610, an antenna array 630, a communication circuit, and a connecting member 670. The communication circuits of the antenna structure 600 may be electrically connected with the main circuit board 520 through the connecting member 670. For example, the communication circuits may include an RFIC 651 and a PMIC 652 and may be disposed in one area of the hinge structure 700 in the form of a single module with the antenna circuit board 610 and the antenna array 630. The connecting member 670 may be a flexible circuit board.

According to an embodiment, the IFIC 653 may be disposed on the main circuit board 520 and may be electrically connected with the RFIC 651. According to an embodiment, upon transmission, the RFIC 651 may up-convert an IF signal (e.g., ranging from about 9 GHz to about 11 GHz) obtained from the IFIC 653 into a selected band of RF signal. Upon receipt, the RFIC 651 may down-convert the RF signal obtained via the antenna array 630 into an IF signal and transfer the IF signal to the IFIC 653.

Referring to FIG. 20, at least a portion of the antenna structure 600 may be disposed in one area of the hinge structure 700, and the antenna structure 600 may include an antenna circuit board 610, an antenna array 630, a communication circuit, and a connecting member 670. Some (e.g., the RFIC 651) of the communication circuits of the antenna structure 600 may be disposed in one area of the hinge structure 700 in the form of a single module with the antenna circuit board 610 and the antenna array 630. The PMIC 652 and the IFIC 653 may be disposed in one area of the main circuit board 520. The PMIC 652 may receive a voltage from the main circuit board 520 and provide necessary power to various components (e.g., the RFIC) on the antenna structure. In FIG. 20, the configuration of FIG. 19 may be applied to the configuration and operation of the electrical connection between the IFIC 653 disposed on the main circuit board 520 and the RFIC 651 disposed on the hinge structure 700.

Referring to FIG. 21, at least a portion of the antenna structure 600 may be disposed in one area of the hinge structure 700, and the antenna structure 600 may include an antenna circuit board 610, an antenna array 630, a communication circuit, and a connecting member 670. Of the antenna structure 600, the antenna circuit board 610 and the antenna array 630 may be disposed in one area of the hinge structure 700, in the form of a single module, and the RFIC 651 may be disposed on the connecting member 670. In FIG. 21, the configuration of FIG. 19 may be applied to the configuration and operation of the electrical connection between the IFIC 653 disposed on the main circuit board 520 and the RFIC 651 disposed on the connecting member 670.

Figure 22:
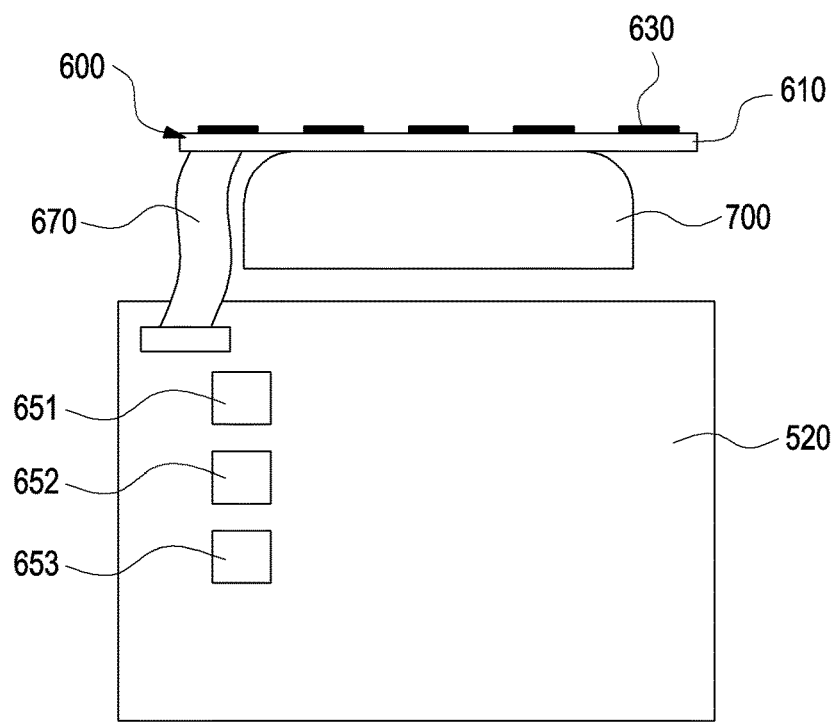
FIG. 22 is a diagram illustrating an antenna structure disposed in an area of a hinge structure of a foldable electronic device and an area of a main circuit board according to various embodiments.

FIG. 22 is a diagram illustrating an antenna structure disposed in an area of a hinge structure of a foldable electronic device and an area of a main circuit board according to various embodiments.

According to various embodiments, an electronic device (e.g., the electronic device 101 of FIGS. 1 to 4) may include a first housing structure (e.g., the first housing structure 310 of FIG. 4), a second housing structure (e.g., the second housing structure 320 of FIG. 4), a main circuit board 520, a hinge structure 510, and/or an antenna structure 600.

The configuration of the main circuit board 520 of FIG. 22 may be identical in whole or part to the configuration of the printed circuit board 521 in the first housing structure (e.g., the first housing structure 310 of FIG. 4) of FIG. 4 or the printed circuit board 522 in the second housing structure (e.g., the second housing structure 320 of FIG. 4). The configuration of the hinge structure 700 and the antenna structure 600 of FIG. 22 may be identical in whole or part to the configuration of the hinge structure 700 and the antenna structure 600 of FIGS. 8 to 11.

According to various embodiments, the hinge module may include a hinge structure 700 and a hinge cover (not shown), and the hinge structure 700 may connect the first housing structure 310 and the second housing structure 320 to be pivotable from the folded status to the unfolded status.

According to various embodiments, referring to FIG. 22, at least a portion of the antenna structure 600 may be disposed in one area of the hinge structure 700, and the antenna structure 600 may include an antenna circuit board 610, an antenna array 630, and a communication circuit. According to an embodiment, the antenna structure 600 may further include a connecting member 670 and/or a shielding member (not shown). According to other embodiments, at least one of the above-mentioned components may be omitted, or at least two of the components may be integrally formed with each other. Of the antenna structure 600, the antenna circuit board 610 and the antenna array 630 may be disposed in one area of the hinge structure 700, in the form of a single module. The RFIC 651, the PMIC 652, and the IFIC 653 may be disposed in one area of the main circuit board 520.

According to an embodiment, the antenna circuit board 610 may include a plurality of conductive layers and a plurality of non-conductive layers alternately stacked with the conductive layers. Electronic components arranged on, or outside of, the antenna circuit board 610 may be electrically connected together via wires and conductive vias formed on or through the conductive layers. According to an embodiment, the antenna array 630 may include a plurality of antenna elements arranged to form directional beams. The antenna elements may be formed on the first surface of the antenna circuit board 610. According to an embodiment, the antenna array 630 may be formed inside the antenna circuit board 610. According to embodiments, the antenna array 630 may include a plurality of antenna arrays (e.g., a dipole antenna array and/or a patch antenna array) of the same or different shapes or kinds.

According to an embodiment, the RFIC 651 may be disposed in an area of the main circuit board 520, spaced apart from the antenna array 630, and may be electrically connected with the antenna array 630 through the connecting member 670. The IFIC 653 may be mounted, on the main circuit board 520, adjacent to the RFIC 651 and may be electrically connected therewith. The RFIC 651 is configured to be able to process signals of a selected frequency band which are transmitted or received via the antenna array 630. According to an embodiment, upon transmission, the RFIC 651 may convert a baseband signal obtained from a CP (not shown) into a designated band of RF signal. Upon receipt, the RFIC 651 may convert the RF signal received via the antenna array 630 into a baseband signal and transfer the baseband signal to the communication processor. According to an embodiment, upon transmission, the RFIC 651 may up-convert an IF signal (e.g., ranging from about 9 GHz to about 11 GHz) obtained from the IFIC 653 into a selected band of RF signal. Upon receipt, the RFIC 651 may down-convert the RF signal obtained via the antenna array 630 into an IF signal and transfer the IF signal to the IFIC 653.

According to an embodiment, the PMIC 652 may be disposed in an area of the main circuit board 520, spaced apart from the antenna array, and may be mounted adjacent to the RFIC 651 and electrically connected therewith. The PMIC 652 may receive a voltage from the main circuit board 520 and provide necessary power to various components (e.g., the RFIC 651) on the antenna structure.

According to various embodiments, a recess may be formed in an area of the hinge structure 700, and a portion of the antenna structure 600 (a portion of the antenna array 630 and the antenna circuit board 610 formed in the form of a module) may be inserted into the recess. For example, the recess of the hinge structure 700 may be shaped as an inwardly dug recess, and a portion of the antenna structure 600 may be seated in the recess and may thus be stably positioned.

According to various embodiments, a connecting member 670, e.g., a coaxial cable connector, a board-to-board connector, an interposer, or a flexible printed circuit board (FPCB), may be included. The antenna array 630 of the antenna structure 600 may be electrically connected with the main circuit board (e.g., the RFIC 651 and/or the PMIC 652) disposed in the second housing structure 320 (or the first housing structure 310) through the connecting member 670.

Figure 23:
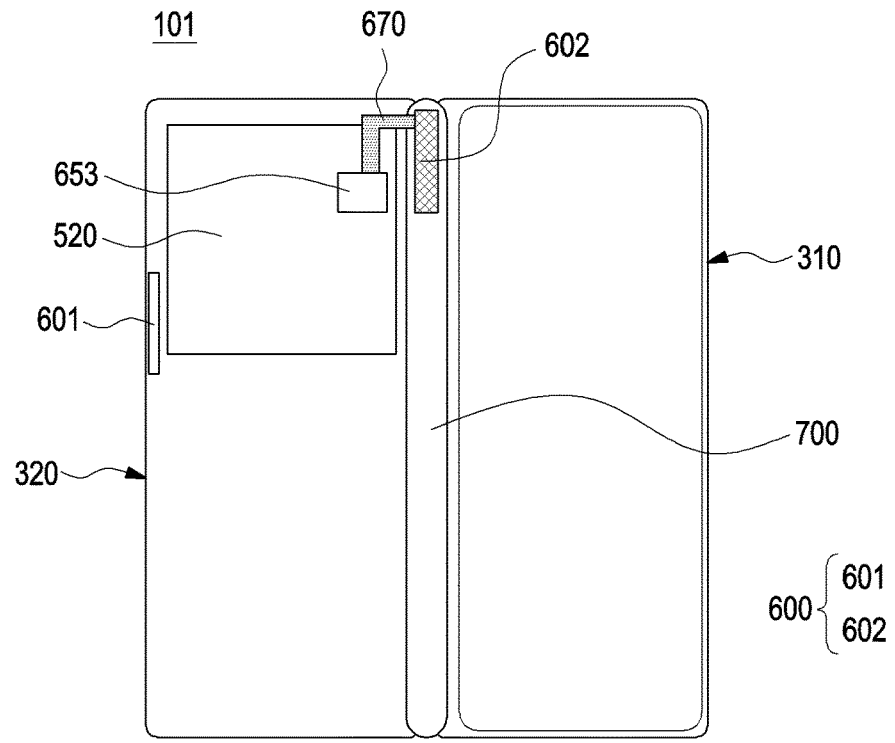
FIG. 23 is a diagram illustrating a hinge structure and an antenna structure in an unfolded state of a foldable electronic device according to various embodiments.
Figure 24:
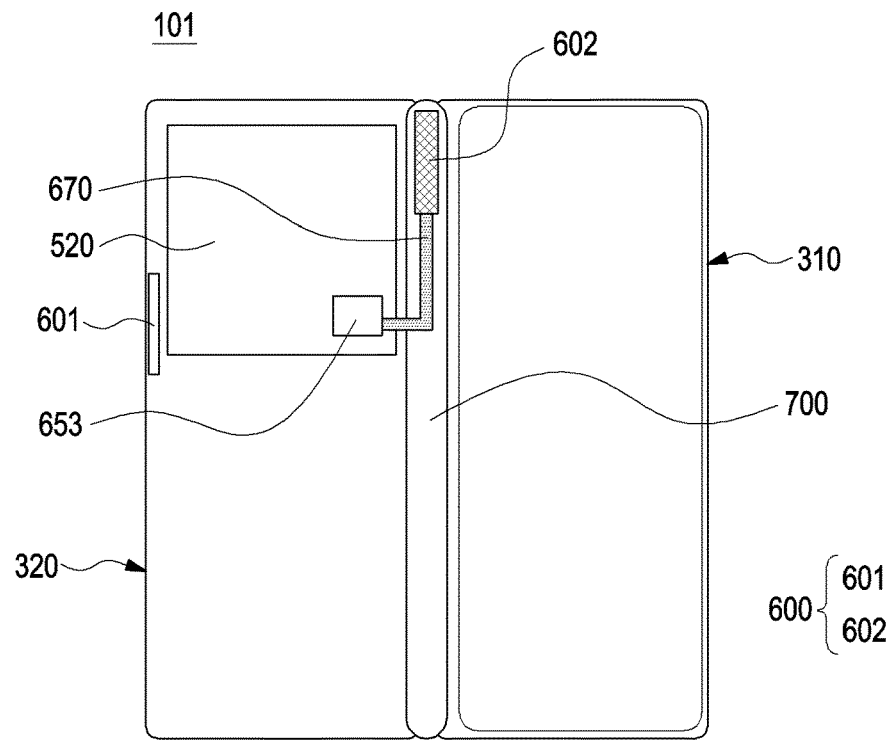
FIG. 24 is a diagram illustrating a hinge structure and an antenna structure in an unfolded state of a foldable electronic device according to various embodiments.
Figure 25:
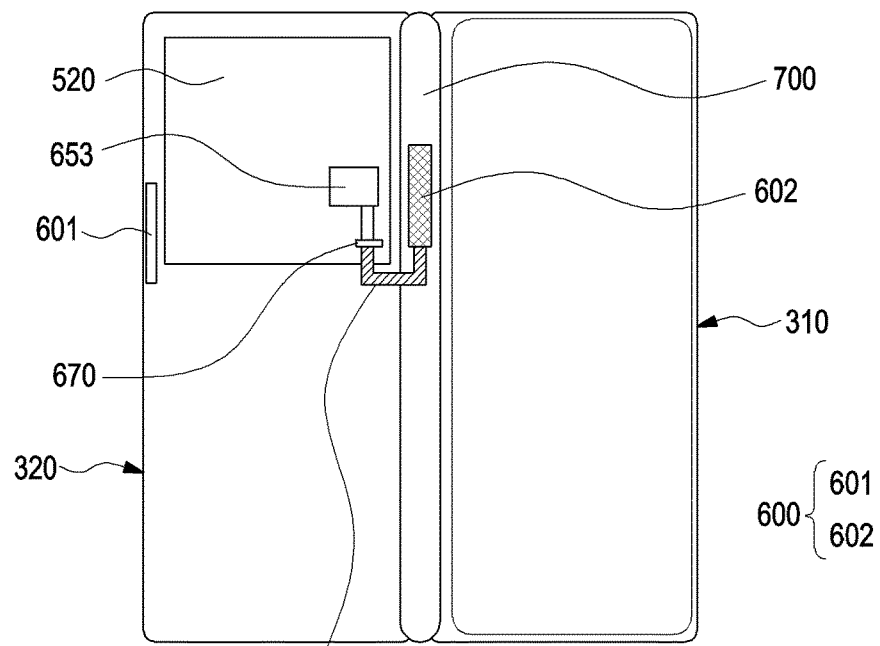
FIG. 25 is a diagram illustrating a hinge structure and an antenna structure in an unfolded state of a foldable electronic device according to various embodiments.
Figure 26:
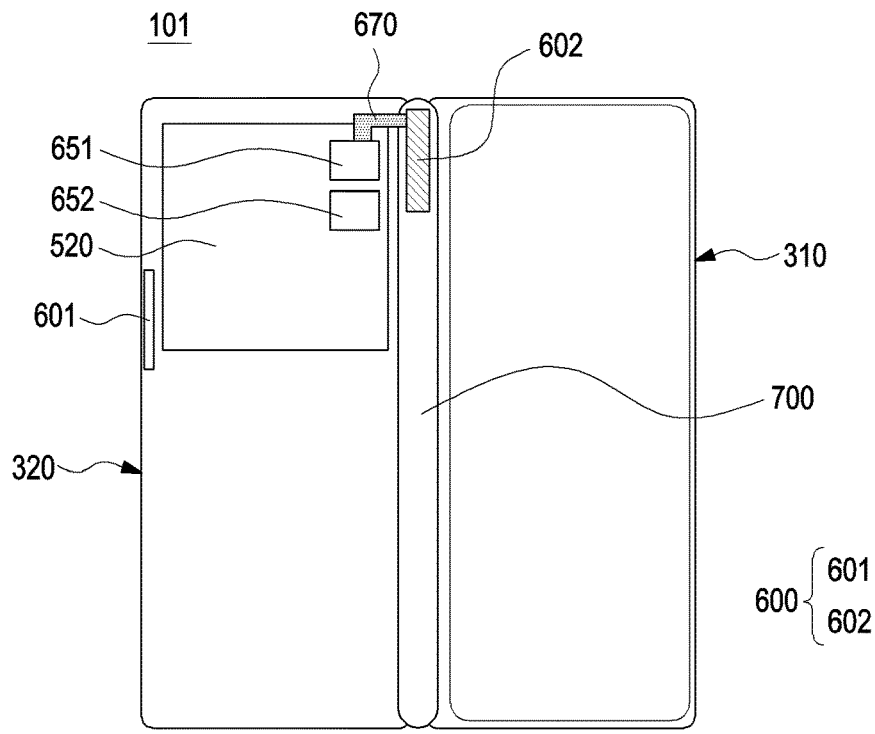
FIG. 26 is a diagram illustrating a hinge structure and an antenna structure in an unfolded status of a foldable electronic device according to various embodiments.
Figure 27:
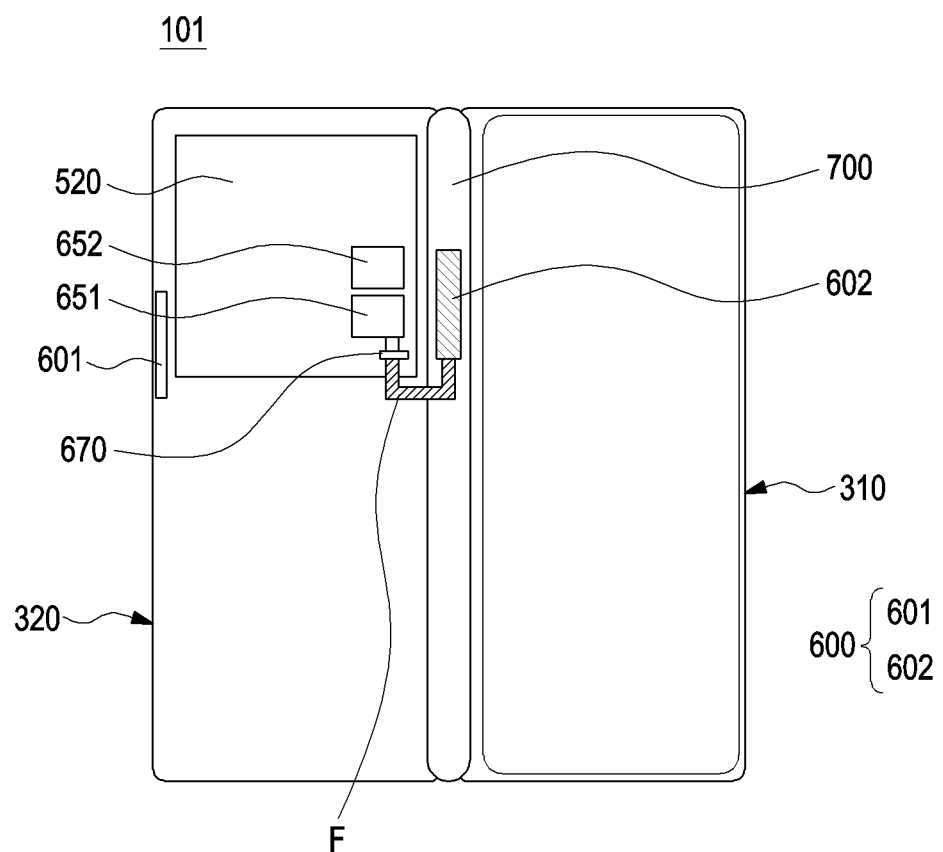
FIG. 27 is a diagram illustrating a hinge structure and an antenna structure in an unfolded state of a foldable electronic device according to various embodiments.

FIG. 23 is a diagram illustrating a hinge structure and an antenna structure in an unfolded state of a foldable electronic device according to various embodiments. FIG. 24 is a diagram illustrating a hinge structure and an antenna structure in an unfolded state of a foldable electronic device according to various embodiments. FIG. 25 is a diagram illustrating a hinge structure and an antenna structure in an unfolded state of a foldable electronic device according to various embodiments. FIG. 26 is a diagram illustrating a hinge structure and an antenna structure in an unfolded state of a foldable electronic device according to various embodiments of the disclosure. FIG. 27 is a diagram illustrating a hinge structure and an antenna structure in an unfolded state of a foldable electronic device according to various embodiments.

According to various embodiments, an electronic device (e.g., the electronic device 101 of FIGS. 1 to 4) may include a first housing structure (e.g., the first housing structure 310 of FIG. 4), a second housing structure (e.g., the second housing structure 320 of FIG. 4), a main circuit board 520, a hinge structure 510, and/or an antenna structure 600.

The configuration of the main circuit board 520 of FIGS. 23 to 27 may be identical in whole or part to the configuration of the printed circuit board 521 in the first housing structure (e.g., the first housing structure 310 of FIG. 4) of FIG. 4 or the printed circuit board 522 in the second housing structure (e.g., the second housing structure 320 of FIG. 4). The configuration of the hinge structure 700 and the antenna structure 600 of FIGS. 23 to 27 may be identical in whole or part to the configuration of the hinge structure 700 and the antenna structure 600 of FIGS. 8 to 11.

Referring to FIGS. 23 and 24, an electronic device 101 may include antenna structures 600. One antenna structure (e.g., the first antenna structure 601) may be disposed on a side area of the second housing structure 320, and another antenna structure (e.g., the second antenna structure 602) may be disposed on the hinge structure 700. For example, the antenna structure 600 may be disposed in the upper end area or middle area of the hinge structure 700, and the antenna structure 600 may include an antenna circuit board (e.g., the antenna circuit board 610 of FIGS. 8 to 11), an antenna array (e.g., the antenna array 630 of FIGS. 8 to 11), a communication circuit, and a connecting member 670. The communication circuits of the antenna structure 600 may be electrically connected with the main circuit board 520 through the connecting member 670. For example, the communication circuits may include an RFIC and a PMIC and may be disposed in the upper end area (e.g., the upper end area P1 of FIG. 7A) or middle area (e.g., the middle area P3 of FIG. 7A) of the hinge structure 700, in the form of a single module with the antenna circuit board 610 and the antenna array 630. The connecting member 670 may be a flexible circuit board extending from the antenna circuit board 610 of the antenna structure 600 to the main circuit board 520 of the second housing structure 320. According to an embodiment, the IFIC 653 may be disposed on the main circuit board 520 and may be electrically connected with the RFIC.

Referring to FIGS. 23 to 25, in the unfolded status of the electronic device 101, when viewed from the rear, the antenna array 630 may be disposed to overlap the third insulating portion (e.g., the third insulating portion 331 of FIG. 16). According to an embodiment, in the unfolded status of the electronic device 101, the hinge cover is in the state of being hidden by the first and second housing structures 310 and 320. Thus, antenna electromagnetic waves may pass through the third insulating portion 331 of the hinge cover and may then be radiated through the first insulating portion (e.g., the first insulating portion 315 of FIG. 18) and/or the second insulating portion (e.g., the second insulating portion 316 of FIG. 18) to the outside.

Referring to FIG. 23, the connecting member 670 may be disposed in an empty space in the upper end area P1 of the hinge structure 700 and extend to the main circuit board 520. To reduce the length of the connecting member 670, the IFIC 653 may be positioned in the upper end area P1 of the second housing structure 320.

Referring to FIG. 24, the connecting member 670 may be disposed on the empty space of the middle area P3 of the hinge structure 700 and extend to the main circuit board 520. To reduce the length of the connecting member 670, the IFIC 653 may be positioned in the middle area P3 of the second housing structure 320. The components disclosed in FIG. 19 may be applied to the connection configuration between the antenna structure 600 and the surrounding components in FIGS. 23 and 24.

Referring to FIG. 25, the connecting member 670 may be a portion of a separate flexible circuit board F for connecting the main circuit board (e.g., the printed circuit board 521 of FIG. 4) in the first housing structure 310 and the main circuit board (e.g., the printed circuit board 522 of FIG. 4) in the second housing structure 320. For example, in the separate flexible circuit board F disposed to cross the hinge structure 700, a design change may be made to electrically connect a partial area to the IFIC 653 disposed on the main circuit board 520.

Referring to FIGS. 26 and 27, an electronic device 101 may include antenna structures 600. One antenna structure (e.g., the first antenna structure 601) may be disposed on a side area of the second housing structure 320, and another antenna structure (e.g., the second antenna structure 602) may be disposed on the hinge structure 700. For example, a portion of the antenna structure 600 may be disposed in the upper end area (e.g., the upper end area P1 of FIG. 7A) or middle area (e.g., the middle area P3 of FIG. 7A) of the hinge structure 700, and the antenna structure 600 may include an antenna circuit board, an antenna array, a communication circuit, and a connecting member 670. For example, the antenna circuit board and antenna array of the antenna structure 600 may be disposed on the hinge structure 700, in the form of a single module, and the communication circuits (the RFIC 651 and the PMIC 652) may be mounted on the main circuit board 520 of the second housing structure 320.

Referring to FIGS. 26 and 27, in the unfolded status of the electronic device 101, when viewed from the rear, the antenna array 630 may be disposed to overlap the third insulating portion (e.g., the third insulating portion 331 of FIG. 16). According to an embodiment, in the unfolded status of the electronic device 101, the hinge cover is in the state of being hidden by the first and second housing structures 310 and 320. Thus, antenna electromagnetic waves may pass through the third insulating portion 331 of the hinge cover and may then be radiated through the first insulating portion (e.g., the first insulating portion 315 of FIG. 18) and/or the second insulating portion (e.g., the second insulating portion 316 of FIG. 18) to the outside.

Referring to FIG. 26, the structure in the form of a single module may be disposed in the upper end area P1 of the hinge structure 700. The connecting member 670 may be disposed in an empty space in the upper end area P1 of the hinge structure 700 and extend to the main circuit board 520. To reduce the length of the connecting member 670, the RFIC 651 and the PMIC 652 may be positioned adjacent to the upper end area P1 of the hinge structure 700.

Referring to FIG. 27, the structure in the form of a single module may be disposed in the middle area P3 of the hinge structure 700. The connecting member 670 may be disposed in an empty space in the middle area P3 of the hinge structure 700 and extend to the main circuit board 520. To reduce the length of the connecting member 670, the RFIC 651 and the PMIC 652 may be positioned adjacent to the middle area P3 of the hinge structure 700. According to an embodiment, the connecting member 670 may be a portion of a separate flexible circuit board F for connecting the main circuit board (e.g., the printed circuit board 521 of FIG. 4) in the first housing structure 310 and the main circuit board (e.g., the printed circuit board 522 of FIG. 4) in the second housing structure 320. For example, in the separate flexible circuit board F disposed to cross the hinge structure 700, a design change may be made to electrically connect a partial area to the RFIC 651 and/or the PMIC 652 disposed on the main circuit board 520.

According to various example embodiments of the disclosure, an electronic device (e.g., the electronic device 101 of FIGS. 1 to 4) may comprise: a first housing (e.g., the first housing structure 310 of FIGS. 1 to 4) including a first insulating portion (e.g., the first insulating portion 315 of FIG. 18), a second housing (e.g., the second housing structure 320 of FIGS. 1 to 4) including a second insulating portion (e.g., the second insulating portion 316 of FIG. 18) adjacent to the first insulating portion, a hinge (e.g., the hinge structure 700 of FIG. 11) connecting the first housing structure and the second housing structure to be pivotable from a folded state to an unfolded state with respect to a pivot shaft, a hinge cover (e.g., the hinge cover or hinge case 330 of FIG. 7B) exposed to an outside and covering the hinge in the folded state and including a third insulating portion (e.g., the third insulating portion 331 of FIG. 16) in at least a partial area thereof, a flexible display (e.g., the display 200 of FIG. 2) configured to be deformable in response to relative motion of the second housing with respect to the first housing, and an antenna structure (e.g., the antenna structure 600 of FIG. 11) including an antenna circuit board (e.g., the antenna circuit board 610 of FIG. 11) disposed in at least a partial area of the hinge and a plurality of antenna elements including at least one antenna forming an array on or in the antenna circuit board. In the unfolded state, the plurality of antenna elements may be disposed to overlap the first insulating portion and/or the second insulating portion. In the folded state, the plurality of antenna elements may be disposed to overlap the third insulating portion of the hinge cover exposed to the outside. In the unfolded state, the plurality of antenna elements may be disposed to overlap the first insulating portion and/or the second insulating portion, and in the folded state, the plurality of antenna elements may be disposed to overlap the third insulating portion of the hinge cover.

According to various example embodiments, in the unfolded state, the plurality of antenna elements may be disposed to overlap the third insulating portion of the hinge cover covered by the first insulating portion and/or the second insulating portion.

According to various example embodiments, at least a portion of the antenna structure may be disposed in a recess (e.g., the recess 711 of FIG. 9) formed in the hinge.

According to various example embodiments, the antenna structure may further include a wireless communication circuit (e.g., the wireless communication circuit 650 of FIG. 9) electrically connected with the antenna circuit board and configured to transmit and/or receive a signal of a designated frequency between 20 GHz and 100 GHz.

According to various example embodiments, the wireless communication circuit is disposed in the recess formed of a metallic material configured to dissipate heat generated from the wireless communication circuit through the recess along the first housing and/or the second housing.

According to various example embodiments, the antenna structure may further include a connecting member (e.g., the connecting member 670 of FIG. 11) extending from an end of the antenna circuit board to an inside of the first housing structure or the second housing structure to electrically connect with a main circuit board.

According to various example embodiments, the connecting member may include at least one of a coaxial cable connector, a board-to-board connector, an interposer, or a flexible printed circuit board (FPCB).

According to various example embodiments, the hinge may include a hinge bracket (e.g., the hinge bracket 710 of FIG. 11) disposed on an upper end of the hinge and covering a rotation area of the hinge. The antenna structure may be disposed to be at least partially seated in a recess formed in the hinge bracket.

According to various example embodiments, the connecting member may extend along the upper end of the hinge in a direction substantially perpendicular to the antenna circuit board to connect with the main circuit board.

According to various example embodiments, the hinge may include an antenna bracket (e.g., the antenna bracket 790 of FIG. 14) disposed in a middle area of the hinge and covering an elastic member comprising an elastic material disposed along a rotation shaft of the hinge. The antenna structure may be disposed to be at least partially seated in a recess formed in the antenna bracket.

According to various example embodiments, an area of the connecting member disposed on the hinge may include a first portion (e.g., the first portion 672a of FIG. 12) disposed in a direction parallel with the antenna circuit board and a second portion (e.g., the second portion 672b of FIG. 12) extending from the first portion and disposed in a direction substantially perpendicular to the first portion.

According to various example embodiments, an area of the connecting member disposed on the hinge may include a first portion (e.g., the first portion 673a of FIG. 15) disposed in a direction parallel with the antenna circuit board, a second portion (e.g., the second portion 673b of FIG. 15) branched from an end of the first portion and extending to face the first housing, and a third portion (e.g., the third portion 673c of FIG. 15) branched from an end of the first portion and extending to face the second housing.

According to various example embodiments, the second portion and/or the third portion may be disposed in a direction substantially perpendicular to the first portion.

According to various example embodiments, the electronic device may further comprise a flexible circuit board disposed to cross the hinge to connect a first main circuit board in the first housing and a second main circuit board in the second housing. The connecting member may be configured as a partial area of the flexible circuit board.

According to various example embodiments, the electronic device may further comprise a main circuit board disposed in the first housing or the second housing and including an IFIC mounted thereon. An RFIC of the antenna structure may be disposed on one surface of the antenna circuit board. A PMIC of the antenna structure may be disposed on one surface of the main circuit board.

According to various example embodiments, the electronic device may further comprise a main circuit board disposed in the first housing or the second housing and including an IFIC mounted thereon. An RFIC and a PMIC of the antenna structure may be disposed on one surface of the main circuit board.

According to various example embodiments of the disclosure, an electronic device (e.g., the electronic device 101 of FIGS. 1 to 4) may comprise: a first housing (e.g., the first housing structure 310 of FIGS. 1 to 4), a second housing (e.g., the second housing structure 320 of FIGS. 1 to 4)), a hinge (e.g., the hinge structure 700 of FIG. 11) connecting the first housing and the second housing to be pivotable from a folded state to an unfolded state with respect to a pivot shaft, a hinge cover (e.g., the hinge cover or hinge case 330 of FIG. 7B) covering the hinge and including a first insulating portion (e.g., the third insulating portion 331 of FIG. 16) in at least a partial area thereof, a flexible display configured to be deformed in response to relative motion of the second housing with respect to the first housing, and an antenna structure (e.g., the antenna structure 600 of FIG. 11) including an antenna circuit board disposed in at least a partial area of the hinge and a plurality of antenna elements comprising at least one antenna forming an array on or in the antenna circuit board. The plurality of antenna elements may be disposed to face the first insulating portion of the hinge cover and may be configured to radiate a directional beam through the first insulating portion.

According to various example embodiments, the first housing may include a second insulating portion (e.g., the first insulating portion 315 of FIG. 18). The second housing may include a third insulating portion (e.g., the second insulating portion 316 of FIG. 18) disposed adjacent to the second insulating portion. In the unfolded state, the plurality of antenna elements may be disposed to face the second insulating portion and/or the third insulating portion.

According to various example embodiments, at least a portion of the antenna structure may be disposed in a recess formed in the hinge.

According to various example embodiments, the antenna structure may further include a wireless communication circuit electrically connected with the antenna circuit board and configured to transmit and/or receive a signal of a designated frequency between 20 GHz and 100 GHz, and a connecting member extending from an end of the antenna circuit board to an inside of the first housing or the second housing to electrically connect with a main circuit board.

It is apparent to one of ordinary skill in the art that the antenna structure and the electronic device including the same according to various embodiments of the disclosure as described above are not limited to the above-described embodiments and those shown in the drawings, and various changes, modifications, or alterations may be made thereto without departing from the scope of the disclosure. It will also be understood that any of the embodiment(s) described herein may be used in conjunction with any other embodiment(s) described herein.

What is claimed is:

1. An electronic device comprising,
a first housing including a first insulating portion;
a second housing including a second insulating portion adjacent to the first insulating portion;
a hinge connecting the first housing and the second housing to be pivotable from a folded state to an unfolded state with respect to a pivot shaft;
a hinge cover exposed to an outside and covering the hinge in the folded state and including a third insulating portion in at least a partial area thereof;
a flexible display configured to be deformable in response to relative motion of the second housing with respect to the first housing; and
an antenna structure including an antenna circuit board disposed in at least a partial area of the hinge and a plurality of antenna elements comprising at least one antenna forming an array on or in the antenna circuit board,
wherein in the unfolded state, the plurality of antenna elements are disposed to overlap the first insulating portion and/or the second insulating portion, and
wherein in the folded state, the plurality of antenna elements are disposed to overlap the third insulating portion of the hinge cover.

2. The electronic device of claim 1, wherein in the unfolded state, the plurality of antenna elements are disposed to overlap the third insulating portion of the hinge cover covered by the first insulating portion and/or the second insulating portion.

3. The electronic device of claim 1, wherein at least a portion of the antenna structure is disposed in a recess formed in the hinge.

4. The electronic device of claim 3, wherein the antenna structure further includes a wireless communication circuit electrically connected with the antenna circuit board and configured to transmit and/or receive a signal of a designated frequency between 20 GHz and 100 GHz.

5. The electronic device of claim 4, wherein the wireless communication circuit is disposed in the recess formed of a metallic material configured to dissipate heat generated from the wireless communication circuit through the recess along the first housing and/or the second housing.

6. The electronic device of claim 1, wherein the antenna structure further includes a connecting member extending from an end of the antenna circuit board to an inside of the first housing or the second housing to electrically connect with a main circuit board.

7. The electronic device of claim 6, wherein the connecting member includes at least one of a coaxial cable connector, a board-to-board connector, an interposer, or a flexible printed circuit board (FPCB).

8. The electronic device of claim 6, wherein the hinge includes,
a hinge bracket disposed on an upper end of the hinge and covering a rotation area of the hinge, and
wherein the antenna structure at least partially seated in a recess formed in the hinge bracket.

9. The electronic device of claim 8, wherein the connecting member extends along the upper end of the hinge in a direction substantially perpendicular to the antenna circuit board to connect with the main circuit board.

10. The electronic device of claim 6, wherein the hinge includes,
an antenna bracket disposed in a middle area of the hinge covering an elastic member comprising an elastic material disposed along a rotation shaft of the hinge, and
wherein the antenna structure is at least partially seated in a recess formed in the antenna bracket.

11. The electronic device of claim 10, wherein an area of the connecting member disposed on the hinge includes a first portion disposed in a direction parallel with the antenna circuit board and a second portion extending from the first portion and disposed in a direction substantially perpendicular to the first portion.

12. The electronic device of claim 10, wherein an area of the connecting member disposed on the hinge includes a first portion disposed in a direction parallel with the antenna circuit board, a second portion branched from an end of the first portion and extending to face the first housing, and a third portion branched from an end of the first portion and extending to face the second housing.

13. The electronic device of claim 12, wherein the second portion and/or the third portion are disposed in a direction substantially perpendicular to the first portion.

14. The electronic device of claim 6, further comprising a flexible circuit board disposed to cross the hinge to connect a first main circuit board in the first housing and a second main circuit board in the second housing,
wherein the connecting member is configured as a partial area of the flexible circuit board.

15. The electronic device of claim 1, further comprising,
a main circuit board disposed in the first housing structure or the second housing structure and including an intermediate frequency integrated circuit (IFIC) mounted thereon,
wherein a radio frequency integrated circuit (RFIC) of the antenna structure is disposed on one surface of the antenna circuit board, and
wherein a power management integrated circuit (PMIC) of the antenna structure is disposed on one surface of the main circuit board.

16. The electronic device of claim 1, further comprising a main circuit board disposed in the first housing or the second housing and including an intermediate frequency integrated circuit (IFIC) mounted thereon,
wherein a radio frequency integrated circuit (RFIC) and a power management integrated circuit (PMIC) of the antenna structure are disposed on one surface of the main circuit board.

17. An electronic device comprising,
a first housing;
a second housing;
a hinge connecting the first housing and the second housing to be pivotable from a folded state to an unfolded state with respect to a pivot shaft;
a hinge cover covering the hinge and including a first insulating portion in at least a partial area thereof;
a flexible display configured to be deformed in response to relative motion of the second housing with respect to the first housing; and
an antenna structure including an antenna circuit board disposed in at least a partial area of the hinge and a plurality of antenna elements comprising at least one antenna forming an array on or in the antenna circuit board,
wherein the plurality of antenna elements are disposed to face the first insulating portion of the hinge cover and are configured to radiate a directional beam through the first insulating portion.

18. The electronic device of claim 17,
wherein the first housing includes a second insulating portion,
wherein the second housing includes a third insulating portion disposed adjacent to the second insulating portion, and
wherein in the unfolded state, the plurality of antenna elements are disposed to face the second insulating portion and/or the third insulating portion.

19. The electronic device of claim 17, wherein at least a portion of the antenna structure is disposed in a recess formed in the hinge.

20. The electronic device of claim 17, wherein the antenna structure further includes,
a wireless communication circuit electrically connected with the antenna circuit board and configured to transmit and/or receive a signal of a designated frequency between 20 GHz and 100 GHz; and
a connecting member extending from an end of the antenna circuit board to an inside of the first housing or the second housing to electrically connect with a main circuit board.

* * * * *